United States Patent
Okuda

(10) Patent No.: US 8,620,224 B2
(45) Date of Patent: Dec. 31, 2013

(54) COMMUNICATION METHOD AND COMMUNICATION APPARATUS

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/369,426

(22) Filed: Feb. 9, 2012

(65) Prior Publication Data

US 2012/0142279 A1 Jun. 7, 2012

Related U.S. Application Data

(63) Continuation of application No. PCT/JP2009/071791, filed on Dec. 28, 2009.

(51) Int. Cl.
  *H04B 7/00* (2006.01)
(52) U.S. Cl.
  USPC ............. 455/68; 455/515; 370/235; 370/252; 370/350; 368/47
(58) Field of Classification Search
  USPC ........................................................... 455/68
  See application file for complete search history.

(56) References Cited

U.S. PATENT DOCUMENTS

| | | | | |
|---|---|---|---|---|
| 5,966,664 | A * | 10/1999 | Hiramatsu et al. | 455/515 |
| 6,236,623 | B1 * | 5/2001 | Read et al. | 368/46 |
| 6,854,059 | B2 * | 2/2005 | Gardner | 713/171 |
| 7,319,684 | B2 * | 1/2008 | Tamaki et al. | 370/337 |
| 7,461,318 | B2 * | 12/2008 | Fukae et al. | 714/749 |
| 7,539,219 | B2 * | 5/2009 | Kwong et al. | 370/510 |
| 7,594,153 | B2 * | 9/2009 | Kim et al. | 714/751 |
| 7,639,765 | B2 * | 12/2009 | Suzuki et al. | 375/354 |
| 7,738,869 | B2 * | 6/2010 | Son et al. | 455/435.1 |
| 7,773,546 | B2 * | 8/2010 | Rajakarunanayake et al. | 370/278 |
| 7,821,876 | B2 * | 10/2010 | Frantz | 368/47 |
| 7,839,858 | B2 * | 11/2010 | Wiemann et al. | 370/394 |
| 7,869,396 | B2 * | 1/2011 | Chun et al. | 370/328 |
| 7,940,687 | B2 * | 5/2011 | Sampath | 370/252 |
| 7,969,943 | B2 * | 6/2011 | Miki et al. | 370/329 |
| 7,979,770 | B2 * | 7/2011 | Lohr et al. | 714/751 |
| 8,005,107 | B2 * | 8/2011 | Suzuki et al. | 370/431 |
| 8,060,023 | B2 * | 11/2011 | Usuda et al. | 455/69 |
| 8,085,623 | B2 * | 12/2011 | Frantz | 368/47 |

(Continued)

FOREIGN PATENT DOCUMENTS

| | | |
|---|---|---|
| JP | 2003-174661 | 6/2003 |
| JP | 2007-336027 | 12/2007 |

(Continued)

OTHER PUBLICATIONS

Notice of Reasons for Rejection dated Jan. 8, 2013, from corresponding Japanese Application No. 2011-547215.

(Continued)

*Primary Examiner* — Hai V Nguyen
(74) *Attorney, Agent, or Firm* — Katten Muchin Rosenman LLP

(57) ABSTRACT

A communication method for transmitting a control signal from a first communication apparatus to a second communication apparatus, wherein the first communication apparatus performs a retransmission process in which the control signal is transmitted repeatedly until a positive acknowledgment signal is received or until a termination condition is satisfied, and the second communication apparatus that received the control signal transmits the positive acknowledgment signal to the first communication apparatus and determines, based on a period of time, a control start timing for starting control commanded by the control signal.

14 Claims, 16 Drawing Sheets

(56) References Cited

U.S. PATENT DOCUMENTS

| | | | | |
|---|---|---|---|---|
| 8,111,700 B2* | 2/2012 | Iwakura et al. | ............... | 370/394 |
| 8,135,446 B2* | 3/2012 | Ji | ................... | 455/574 |
| 8,149,749 B2* | 4/2012 | Maeda et al. | ................. | 370/311 |
| 8,204,011 B2* | 6/2012 | Kim et al. | ..................... | 370/329 |
| 8,213,329 B2* | 7/2012 | Ishii | ............................ | 370/252 |
| 8,243,657 B2* | 8/2012 | Park et al. | .................... | 370/328 |
| 8,271,860 B2* | 9/2012 | Zhou et al. | ................... | 714/790 |
| 8,320,337 B2* | 11/2012 | Noh et al. | ..................... | 370/335 |
| 8,332,702 B2* | 12/2012 | Pinheiro et al. | .............. | 714/748 |
| 8,411,634 B2* | 4/2013 | Miki et al. | ................... | 370/329 |
| 8,413,001 B2* | 4/2013 | Zhu et al. | ..................... | 714/748 |
| 8,443,247 B2* | 5/2013 | Duan et al. | ................... | 714/748 |
| 8,493,904 B2* | 7/2013 | Kang et al. | ................... | 370/313 |
| 2006/0154663 A1* | 7/2006 | Son et al. | ................. | 455/435.1 |
| 2007/0183451 A1* | 8/2007 | Lohr et al. | ................... | 370/473 |
| 2007/0202801 A1* | 8/2007 | Frantz | ......................... | 455/3.05 |
| 2007/0223416 A1* | 9/2007 | Baker et al. | .................. | 370/328 |
| 2008/0002688 A1* | 1/2008 | Kim et al. | ..................... | 370/389 |
| 2008/0101411 A1* | 5/2008 | Takahashi et al. | ........... | 370/473 |
| 2008/0192674 A1* | 8/2008 | Wang et al. | ................... | 370/315 |
| 2008/0298322 A1* | 12/2008 | Chun et al. | ................... | 370/335 |
| 2009/0180414 A1* | 7/2009 | Maeda et al. | ................. | 370/311 |
| 2010/0061361 A1* | 3/2010 | Wu | ................................ | 370/350 |
| 2010/0128652 A1* | 5/2010 | Lee et al. | ..................... | 370/315 |
| 2010/0265937 A1* | 10/2010 | Frantz | ........................... | 370/350 |
| 2011/0006908 A1* | 1/2011 | Frantz | ..................... | 340/825.21 |
| 2011/0019555 A1* | 1/2011 | Gotoh et al. | .................. | 370/252 |
| 2011/0029834 A1* | 2/2011 | Yang et al. | .................... | 714/749 |
| 2011/0044196 A1* | 2/2011 | Ishii | ............................. | 370/252 |
| 2011/0044243 A1* | 2/2011 | Yi et al. | ......................... | 370/328 |
| 2011/0113299 A1* | 5/2011 | Power et al. | ................... | 714/748 |
| 2011/0164694 A1* | 7/2011 | Yamasaki et al. | ............. | 375/259 |
| 2011/0194432 A1* | 8/2011 | Kato et al. | .................... | 370/252 |
| 2011/0205928 A1* | 8/2011 | Pelletier et al. | ............... | 370/252 |
| 2011/0222404 A1* | 9/2011 | Watson et al. | ................. | 370/235 |
| 2011/0305182 A1* | 12/2011 | Suzuki et al. | ................. | 370/311 |
| 2012/0039285 A1* | 2/2012 | Seo et al. | ....................... | 370/329 |
| 2012/0170485 A1* | 7/2012 | Maeda et al. | ................. | 370/252 |
| 2012/0230273 A1* | 9/2012 | He et al. | ........................ | 370/329 |
| 2012/0275440 A1* | 11/2012 | Park et al. | ..................... | 370/336 |

FOREIGN PATENT DOCUMENTS

| | | |
|---|---|---|
| JP | 2008-524956 | 7/2008 |
| JP | 2009-521891 | 6/2009 |
| WO | 20061073297 | 7/2006 |
| WO | 2007/078142 | 7/2007 |

OTHER PUBLICATIONS

International Search Report dated Feb. 9, 2010, from corresponding International Application No. PCT/JP2009/071791.

Youngsang Cho, et al. "Combined Mechanism using both ARQ and Scheduling for Efficient Transmission in OFDMA System" International Conference on Advanced Communication Technology, Feb. 15, 2009, vol. 3, pp. 1800-1803.

* cited by examiner

COMMUNICATION METHOD AND COMMUNICATION APPARATUS

CROSS-REFERENCE TO RELATED APPLICATIONS

The present application is a continuation application based on International application No. PCT/JP2009/071791, filed on Dec. 28, 2009, the entire contents of which are incorporated herein by reference.

FIELD

The embodiments discussed herein are related to a communication method and a communication apparatus.

BACKGROUND

In certain radio communication systems, when one communication apparatus sends a control message commanding another communication apparatus to execute a given control operation, the timing for starting the control operation is synchronized between the two apparatuses. Further, to achieve the synchronization of the start timing, the control start timing may be specified in the control message.

Standards for such radio communication systems include, for example, the IEEE 802.16 standards for which standardization is being promoted at the Institute of Electrical and Electronics Engineers (IEEE). The IEEE 802.16 standards provide that a radio frame number may be included as control start timing in a control message that a base station apparatus transmits to a mobile station apparatus. The radio frame number may be a sequence number appended to a radio frame of a prescribed period such as, for example, 5 ms.

Further, in the IEEE 802.16 standards, a MOB_SLP-RSP message to be used for the control of a sleep mode operation, for example, is defined as a control message for synchronizing the control start timing between the base station apparatus and the mobile station apparatus. The sleep mode operation is a mode of operation in which the mobile station apparatus temporarily suspends uplink and downlink transmissions while maintaining connection-related information. The MOB_SLP-RSP message carries as the control start timing the radio frame number of the radio frame at which the mobile station apparatus enters an unavailable interval.

FIG. 1 is a diagram illustrating one example of the sleep mode operation. At radio frame number N, the base station apparatus BS transmits the MOB_SLP-RSP message to the mobile station apparatus MS. The MOB_SLP-RSP message carries "N+2" as the radio frame number indicating the control start timing. Therefore, the mobile station apparatus enters the unavailable interval starting at the radio frame whose radio frame number is "N+2". In the following description, the radio frame number indicating the control start timing may be referred to as the "start frame number" (SFN).

Certain radio communication systems employ retransmission request protocols. There are a variety of retransmission request protocols, but generally, when data is received correctly, the receiving end returns a positive acknowledgment (ACK) signal to the transmitting end. The transmitting end retransmits the data repeatedly until the positive acknowledgment signal is received or until a prescribed termination condition is satisfied.

For example, in the IEEE 802.16m standard currently under study in the IEEE 802.16 Working Group, the control message is transmitted by utilizing Hybrid Automatic Repeat Request (HARQ).

In the prior art, there is proposed a method for controlling an idle mode in a broadband wireless access communication system. The method includes the steps of: transmitting to a mobile station, by a base station, a de-registration command for commanding state transition to the idle mode; and transmitting, by the mobile station, a response message to the de-registration command. A count value increases each time the base station transmits the de-registration command, and the base station can retransmit the de-registration command until the count value reaches a preset maximum number of retransmissions. At the time of transmitting the de-registration command, starting by the base station a second wait timer to count a time to maintain connection information for the mobile station.

There is also proposed a method of retransmitting a data block through an HARQ. The method includes the steps of: retransmitting a data block through a HARQ by a preset maximum allowable number of times in a physical layer; retransmitting a data block through an HARQ by a preset number of times in a physical layer; reporting a reception of a NACK (Not ACKnowledgement) signal to a RLC layer when receiving the NACK signal by the maximum allowable number of times; and determining whether or not the data block is retransmitted. The method further includes receiving status report information through the physical layer, wherein whether or not the data block is retransmitted is determined on the basis of the status report information.

Related art is disclosed in Japanese National Publication of International Patent Applications No. 2008-524956 and No. 2009-521891.

SUMMARY

According to one embodiment, there is provided a communication method for transmitting a control signal from a first communication apparatus to a second communication apparatus. In this method, the first communication apparatus performs a retransmission process in which the control signal is transmitted repeatedly until a positive acknowledgment signal is received or until a termination condition is satisfied, and the second communication apparatus that received the control signal transmits the positive acknowledgment signal to the first communication apparatus and determines, based on a period of time, a control start timing for starting control commanded by the control signal.

According to another embodiment, there is provided a second communication apparatus for use in a communication system which includes a first communication apparatus and a second communication apparatus, as the second communication apparatus. The second communication apparatus includes: a positive acknowledgment signal transmitting unit which transmits a positive acknowledgment signal to the first communication apparatus when the second communication apparatus received the control signal; and a start timing determining unit which, when the second communication apparatus received the control signal, determines, based on a period of time, a control start timing for starting control commanded by the control signal.

According to another embodiment, there is provided a communication apparatus for use in a communication system which includes a first communication apparatus and a second communication apparatus, as the first communication apparatus. The first communication apparatus includes: a transmitting unit which performs a retransmission process in which a control signal is transmitted repeatedly until a positive acknowledgment signal indicating correct reception of the control signal by the second communication apparatus is received or until a termination condition is satisfied; and a start timing determining unit which, when the first communication apparatus received the positive acknowledgment signal, determines, based on a period of time, a control start timing for starting control commanded by the control signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
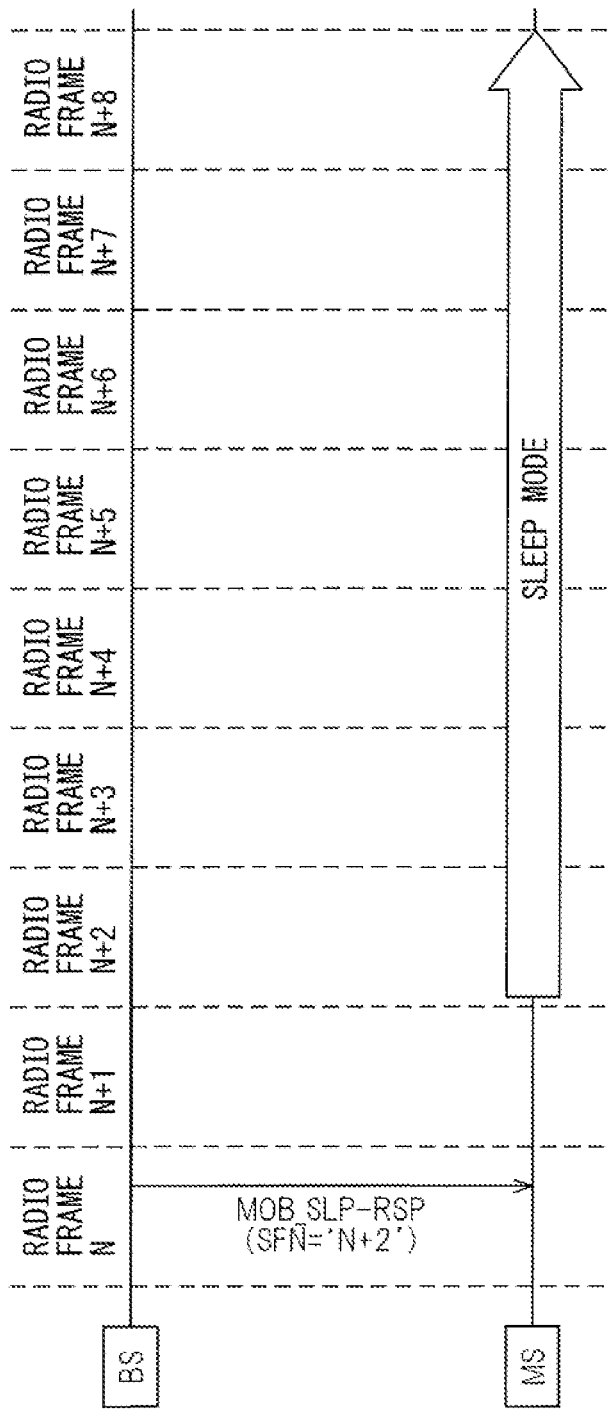
FIG. 1 is a diagram illustrating one example of a sleep mode operation.
Figure 2:
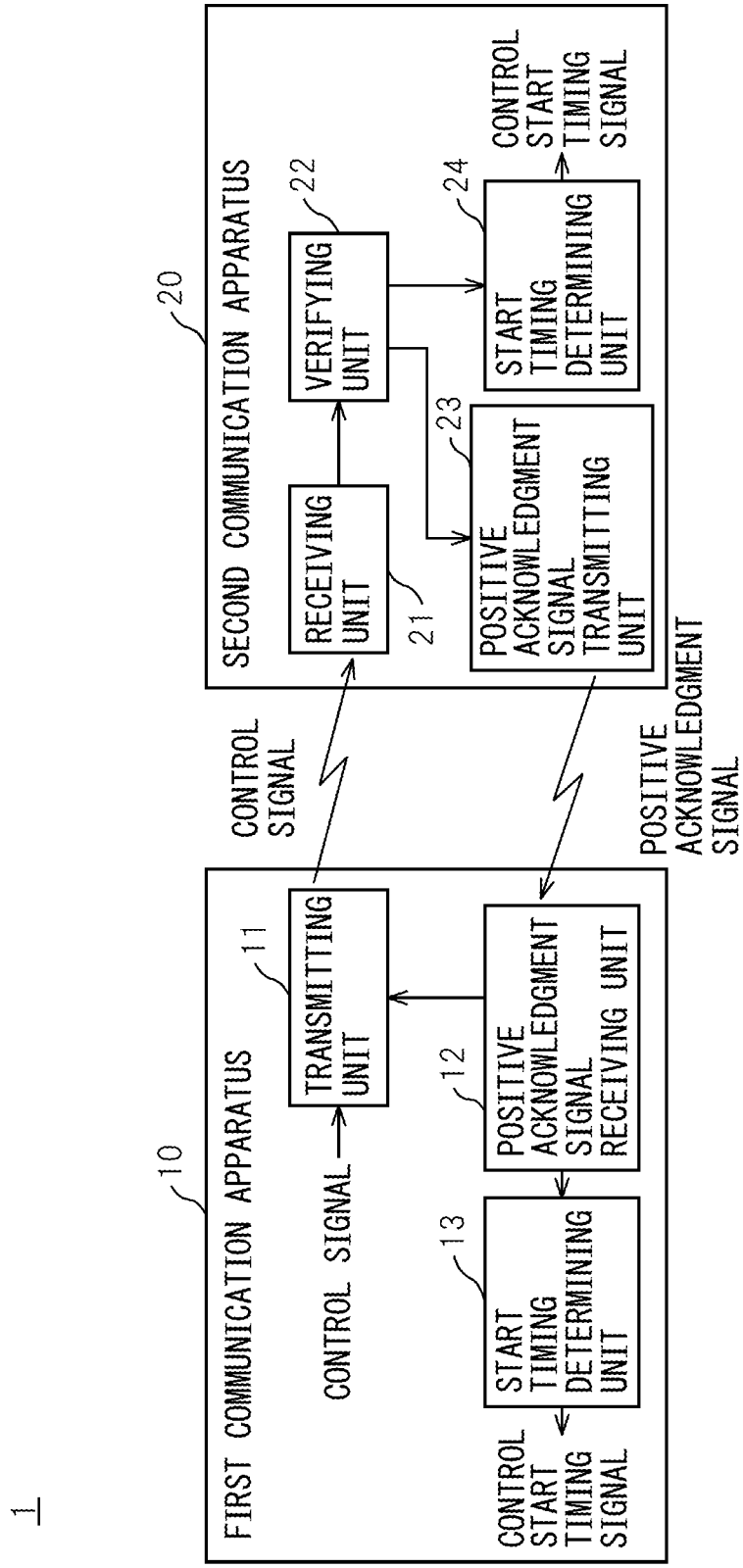
FIG. 2 is a diagram illustrating a first configuration example of a communication system.

Preferred embodiments will be described below with reference to the accompanying drawings. FIG. 2 is a diagram illustrating a first configuration example of a communication system. The communication system 1 includes a first communication apparatus 10 and a second communication apparatus 20.

The first communication apparatus 10 includes a transmitting unit 11, a positive acknowledgment signal receiving unit 12, and a start timing determining unit 13. The second communication apparatus 20 includes a receiving unit 21, a verifying unit 22, a positive acknowledgment signal transmitting unit 23, and a start timing determining unit 24.

The transmitting unit 11 transmits to the second communication apparatus 20 at a given timing a control signal for commanding the second communication apparatus 20 to execute a prescribed operation. The transmitting unit 11 performs a retransmission process in which the control signal is transmitted repeatedly until a positive acknowledgment signal indicating correct reception of the control signal by the second communication apparatus 20 is received or until a prescribed termination condition is satisfied.

The prescribed termination condition may be any suitable condition chosen to prevent endless retransmission in case the transmitting unit 11 is unable to receive the positive acknowledgment signal. The prescribed termination condition may be satisfied, for example, when the first communication apparatus 10 has transmitted the control signal a predetermined maximum allowable number of times. Alternatively, the prescribed termination condition may be satisfied, for example, when a predefined time has elapsed. The transmitting unit 11 may perform the retransmission by utilizing, for example, HARQ.

The positive acknowledgment signal receiving unit 12 receives the positive acknowledgment signal indicating that the control signal has been received correctly by the second communication apparatus 20. When the first communication apparatus 10 has received the positive acknowledgment signal, the start timing determining unit 13 determines, based on a predetermined period of time, the timing for starting the control commanded by the control signal. For example, the start timing determining unit 13 may determine that the control commanded by the control signal is to be started when the predetermined period of time has elapsed after transmitting the control signal whose correct reception has been confirmed by the positive acknowledgment signal received by the positive acknowledgment signal receiving unit 12. For example, suppose that the control signal was transmitted at a given time frame; then, the start timing determining unit 13 may determine the control start timing by adding the predetermined period of time to the time corresponding to the time frame at which the control signal was transmitted.

On the other hand, the receiving unit 21 in the second communication apparatus 20 receives the control signal transmitted from the first communication apparatus 10. The verifying unit 22 verifies whether the control signal transmitted from the first communication apparatus 10 has been received correctly or not.

When the second communication apparatus 20 has received the control signal, if the control signal has been received correctly, for example, the positive acknowledgment signal transmitting unit 23 transmits the positive acknowledgment signal to the first communication apparatus 10. When the second communication apparatus 20 has received the control signal, if the control signal has been received correctly, for example, the start timing determining unit 24 determines, based on the predetermined period of time, the timing for starting the control commanded by the control signal. For example, the start timing determining unit 24 may determine that the control commanded by the control signal is to be started when the predetermined period of time has elapsed after the control signal was received correctly. For example, suppose that the control signal was transmitted at a given time frame; then, the start timing determining unit 24 may determine the control start timing by adding the predetermined period of time to the time corresponding to the time frame at which the control signal was received correctly.

Next, the processing performed in the communication system 1 depicted in FIG. 2 will be described below. The first communication apparatus performs a retransmission process in which the control signal is transmitted repeatedly until a positive acknowledgment signal is received or until a prescribed termination condition is satisfied. The second communication apparatus that received the control signal transmits the positive acknowledgment signal to the first communication apparatus and determines, based on the predetermined period of time, the control start timing for starting the control commanded by the control signal. The first communication apparatus that received the positive acknowledgment signal determines the control start timing based on predetermined period of time. This sequence of operations may be implemented, for example, as illustrated below with reference to FIG. 3 and FIG. 4.

Figure 3:
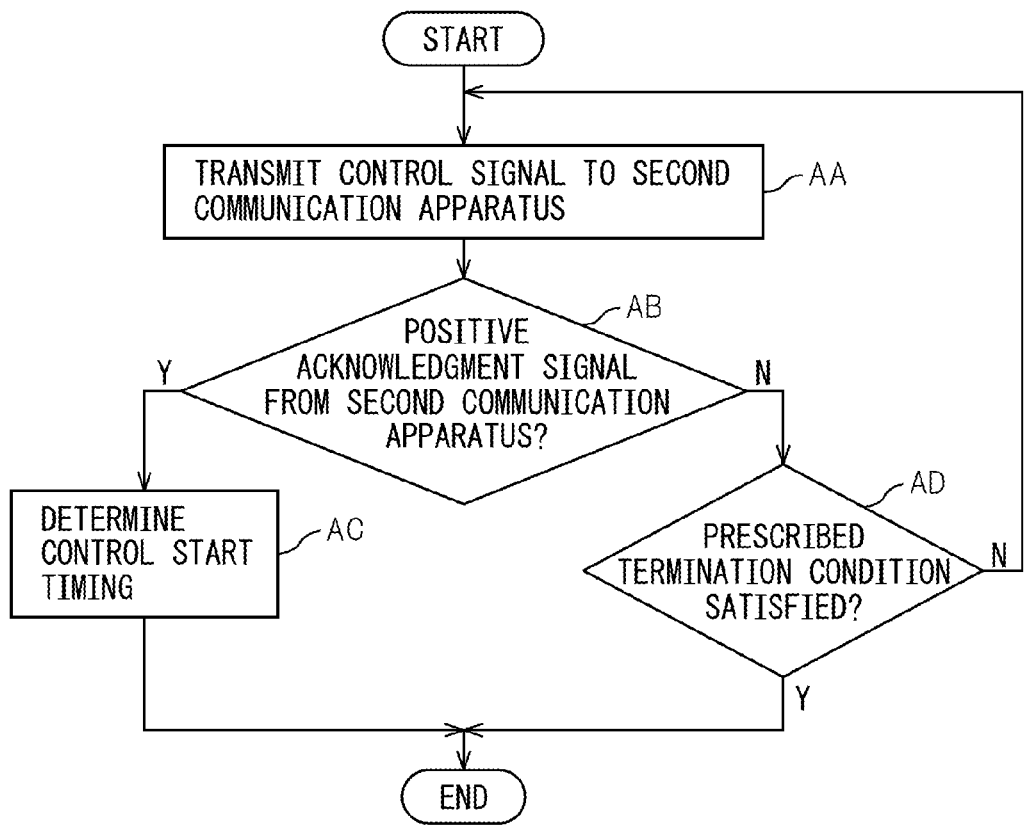
FIG. 3 is a diagram illustrating the processing performed in a first communication apparatus depicted in FIG. 2.

FIG. 3 is a diagram illustrating the processing performed in the first communication apparatus 10 depicted in FIG. 2. In an alternative embodiment, the following operations AA to AD may be implemented as steps.

In operation AA, the transmitting unit 11 transmits the control signal to the second communication apparatus 20. In operation AB, the transmitting unit 11 and the start timing determining unit 13 determine whether the positive acknowledgment signal receiving unit 12 has received a positive acknowledgment signal. If a positive acknowledgment signal is received (Y in operation AB), the process proceeds to operation AC. If no positive acknowledgment signal is received (N in operation AB), the process proceeds to operation AD.

In operation AC, the start timing determining unit 13 determines that the control is to be started when the predetermined period of time has elapsed after transmitting in operation AA the control signal whose correct reception has been confirmed in operation AB.

On the other hand, in operation AD, the transmitting unit 11 determines whether the prescribed termination condition is satisfied or not. If the prescribed termination condition is satisfied (Y in operation AD), the process is terminated. If the prescribed termination condition is not satisfied (N in operation AD), the process returns to operation AA.

Figure 4:
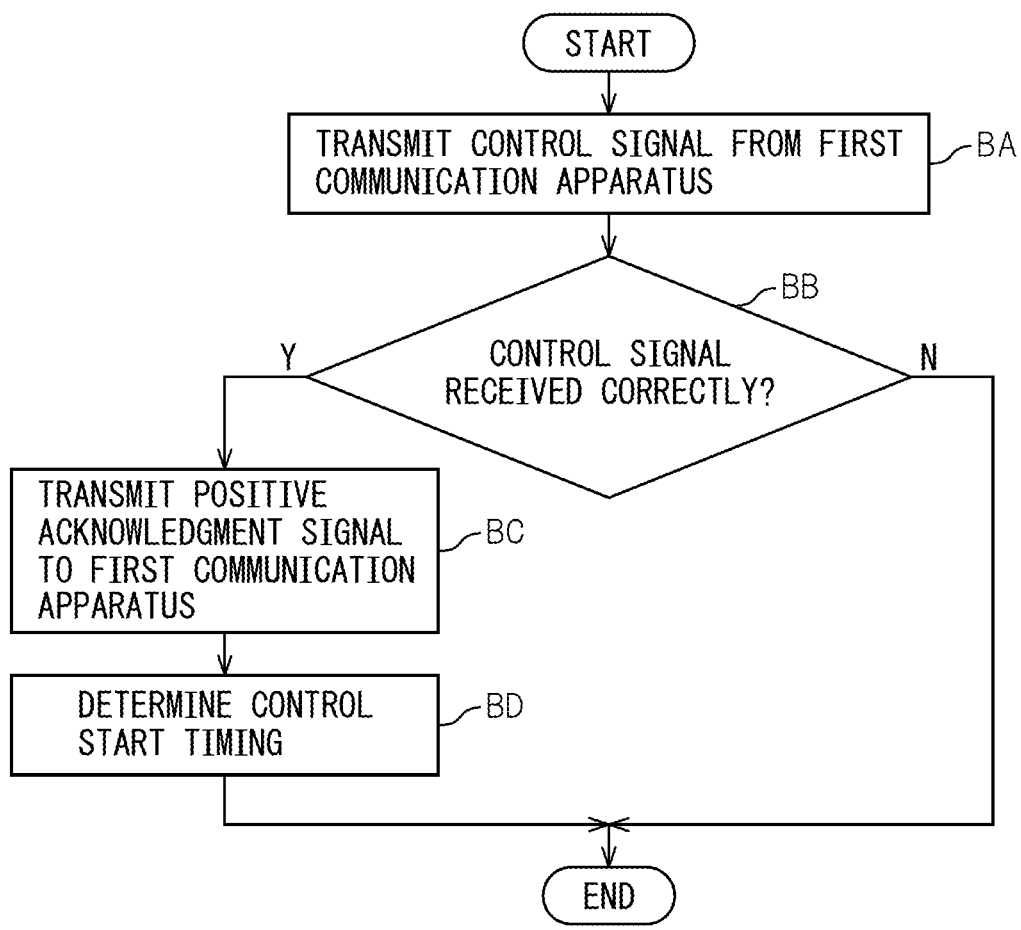
FIG. 4 is a diagram illustrating the processing performed in a second communication apparatus depicted in FIG. 2.

FIG. 4 is a diagram illustrating the processing performed in the second communication apparatus 20 depicted in FIG. 2. In an alternative embodiment, the following operations BA to BD may be implemented as steps.

In operation BA, the receiving unit 21 receives the control signal transmitted from the first communication apparatus 10. In operation BB, the verifying unit 22 verifies whether the control signal has been correctly received or not. If the control signal has been received correctly (Y in operation BB), the process proceeds to operation BC.

If the control signal has not been received correctly (N in operation BB), the process is terminated. In a certain embodiment, if the control signal has not been received correctly (N in operation BB), the second communication apparatus 20 may transmit a negative acknowledgment signal, instead of a positive acknowledgment signal, to the first communication apparatus 10.

In operation BC, the second communication apparatus 20 transmits a positive acknowledgment signal to the first communication apparatus 10. In operation BD, the start timing determining unit 24 determines that the control is to be started when the predetermined period of time has elapsed after correct reception of the control signal. After that, the process is terminated.

According to the present embodiment, the first communication apparatus 10 and the second communication apparatus 20 each determine the control start timing by reference to the time at which the control signal was received correctly. It thus becomes possible to determine the control start timing even before the end of the period during which the transmitting unit 11 in the first communication apparatus 10 may retransmit the control signal because of non-reception of the positive acknowledgment signal, i.e., even before the expiration of the period that is allowed to elapse until the prescribed termination condition is satisfied. In this way, the control start timing can be advanced compared with the prior art control start timing determining method.

In one embodiment, the first communication apparatus 10 may be a base station apparatus, and the second communication apparatus 20 may be a mobile station apparatus. In an alternative embodiment, the first communication apparatus 10 may be a mobile station apparatus, and the second communication apparatus 20 may be a base station apparatus. The same applies to other embodiments described herein.

When the first communication apparatus 10 is a base station apparatus, and the second communication apparatus 20 is a mobile station apparatus, the control signal may be, for example, the previously described MOB_SLP-RSP message. For example, the control signal may be a signal for commanding the mobile station apparatus to begin scanning of the neighbor base station apparatuses. For example, the control signal may be a signal for commanding the mobile station apparatus in the process of handover to commence connection with a handover target base station apparatus. Various signals concerning control that needs start timing synchronization may be included in the control signal. Further, various signals where it is desired to reduce the waiting time to start control, i.e., wherein it is desired to advance the control start timing, may also be included. On the other hand, various signals concerning control that does not need to start timing synchronization may not be included in the control signal. Control messages to be described later may be the same as these signals.

The value defining the predetermined period of time that is used when determining the control start timing may be stored in the control signal and transmitted from the first communication apparatus 10 to the second communication apparatus 20. For example, for each control signal, the value of the predetermined period of time may be stored in the control signal and transmitted from the first communication apparatus 10 to the second communication apparatus 20. The value of the predetermined period of time may be determined for each control signal.

The value of the predetermined period of time may be stored in a control signal other than the control signal for which the control start timing is determined, and may be transmitted in advance from the first communication apparatus 10 to the second communication apparatus 20 or from the second communication apparatus 20 to the first communication apparatus 10. By thus transferring the value of the predetermined period of time between the first communication apparatus 10 and the second communication apparatus 20, the value of the predetermined period of time may be shared between the first communication apparatus 10 and the second communication apparatus 20. The value of the predetermined period of time may be stored in advance as a preset value in both the first communication apparatus 10 and the second communication apparatus 20.

If the second communication apparatus 20 returns a positive acknowledgment signal by receiving the control signal correctly, the first communication apparatus 10 may fail to receive the positive acknowledgment signal. Further, if the second communication apparatus 20 returns a positive acknowledgment signal by receiving the control signal correctly, the first communication apparatus 10 may erroneously determine that the returned signal is not a positive acknowledgment signal. In such cases, the first communication apparatus 10 retransmits the same control signal to the second communication apparatus 20.

In view of this, the predetermined period of time may be set longer than the retransmission period allowed for the transmitting unit 11 in the first communication apparatus 10 to retransmit the control signal because of non-reception of the positive acknowledgment signal. By thus setting the length of the predetermined period of time, the second communication apparatus 20 is allowed to receive the retransmitted control signal before the control start timing arrives.

After the control signal has been received correctly, if the same control signal is received again before the control start timing arrives, the start timing determining unit 24 may determine the control start timing once again based on the predetermined period of time. That is, after the control signal has been received correctly, if the same control is received again before the control start timing arrives, the start timing determining unit 24 may change the control start timing to the timing corresponding to the time at which the predetermined period of time has elapsed after the same control signal was correctly received again. For example, after the control signal has been received correctly, if the same control is received again before the control start timing arrives, the start timing determining unit 24 may recalculate the control start timing by adding the predetermined period of time to the time corresponding to the time frame at which the control signal was correctly received again.

Figure 5:
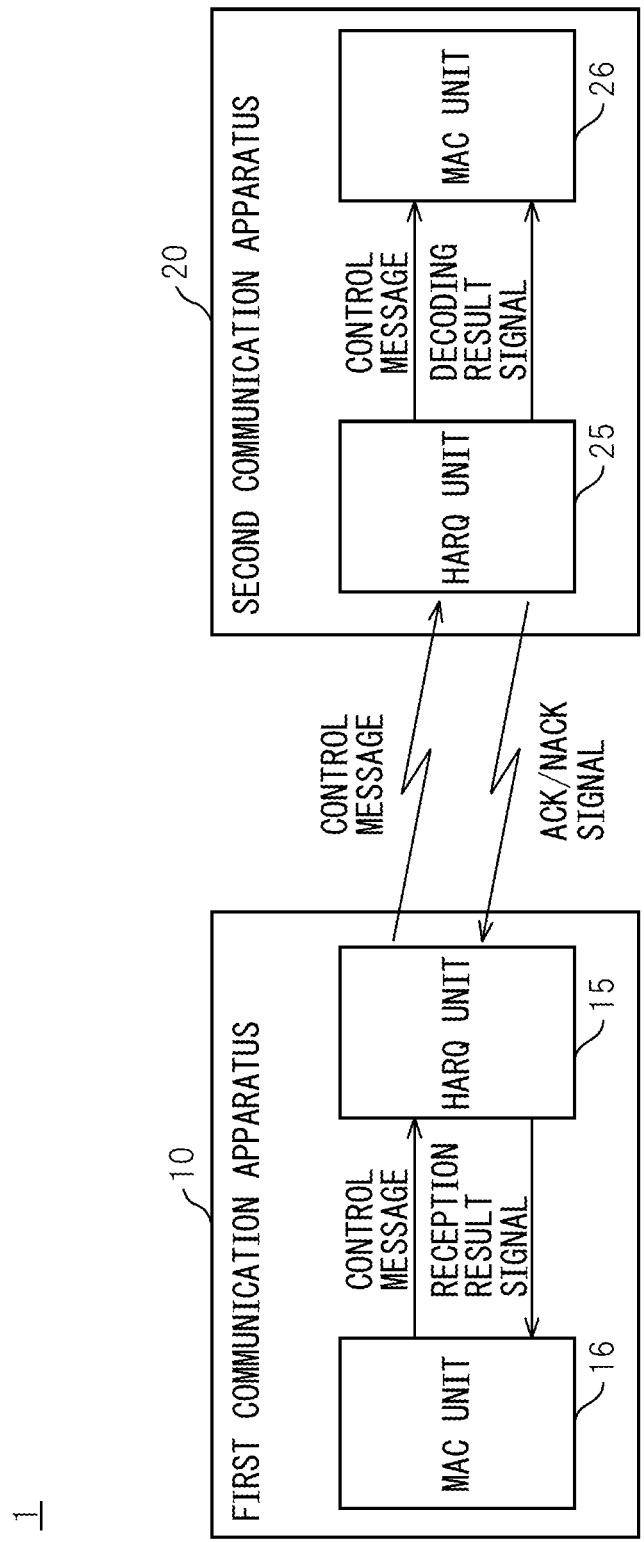
FIG. 5 is a diagram illustrating a second configuration example of a communication system.

Next, a description will be given of an embodiment of a communication system which transmits a control signal by utilizing HARQ and in which the control signal is generated, interpreted, and controlled at the media access control (MAC) layer. FIG. 5 is a diagram illustrating a second configuration example of a communication system.

The communication system 1 includes a first communication apparatus 10 and a second communication apparatus 20. The first communication apparatus 10 includes a HARQ unit 15 and a MAC unit 16. The second communication apparatus 20 includes a HARQ unit 25 and a MAC unit 26.

The HARQ unit 15 is given as an example of the transmitting unit described in the appended claims. The MAC unit 16 is given as an example of the start timing determining unit of the first communication apparatus described in the appended claims. The HARQ unit 25 is given as an example of the positive acknowledgment signal transmitting unit described in the appended claims. The MAC unit 26 is given as an example of the start timing determining unit of the second communication apparatus described in the appended claims.

The MAC unit 16 creates a control message to be transmitted to the second communication apparatus 20. The control message is a message by which the first communication apparatus 10 commands the second communication apparatus 20 to execute a prescribed operation, and is given as an example of the control message described in the appended claims.

The HARQ unit 15 transmits the control message created by the MAC unit 16 to the second communication apparatus 20 by utilizing HARQ. The HARQ unit 15 receives an ACK signal or a NACK signal from the second communication apparatus 20. The HARQ unit 15 sends a reception result signal to the MAC unit 16. The reception result signal indicates whether or not an ACK signal has been received from the second communication apparatus 20.

When the reception result signal indicates the reception of an ACK signal, the MAC unit 16 calculates the control start timing at which the control commanded by the control message is to be started, by adding a predetermined offset value to the time corresponding to the time frame at which the control message whose correct reception has been confirmed by the ACK signal was transmitted. The predetermined offset value is given as an example of the predetermined period of time described in the appended claims.

In the second communication apparatus 20, the HARQ unit 25 receives the control message from the first communication apparatus 10 by utilizing HARQ. The HARQ unit 25 determines whether the control message has been successfully received or not. That is, the HARQ unit 25 determines whether the control message has been correctly received or not. The HARQ unit 25 may determine whether the control message has been successfully received or not, based on the result of the decoding of the control message.

The HARQ unit 25 sends a decoding result signal indicating the result of the decoding to the MAC unit 26. When the control message has been successfully received, the HARQ unit 25 passes the received control message to the MAC unit 26. Depending on the result of the decoding, the HARQ unit 25 returns an ACK signal or a NACK signal to the first communication apparatus 10.

The MAC unit 26 interprets the control message received from the first communication apparatus 10. When the decoding result signal indicates successful reception of the control message, the MAC unit 26 calculates the control start timing at which the control commanded by the control message is to be started, by adding the predetermined offset value to the time corresponding to the time frame at which the control message was correctly received.

Figure 6:
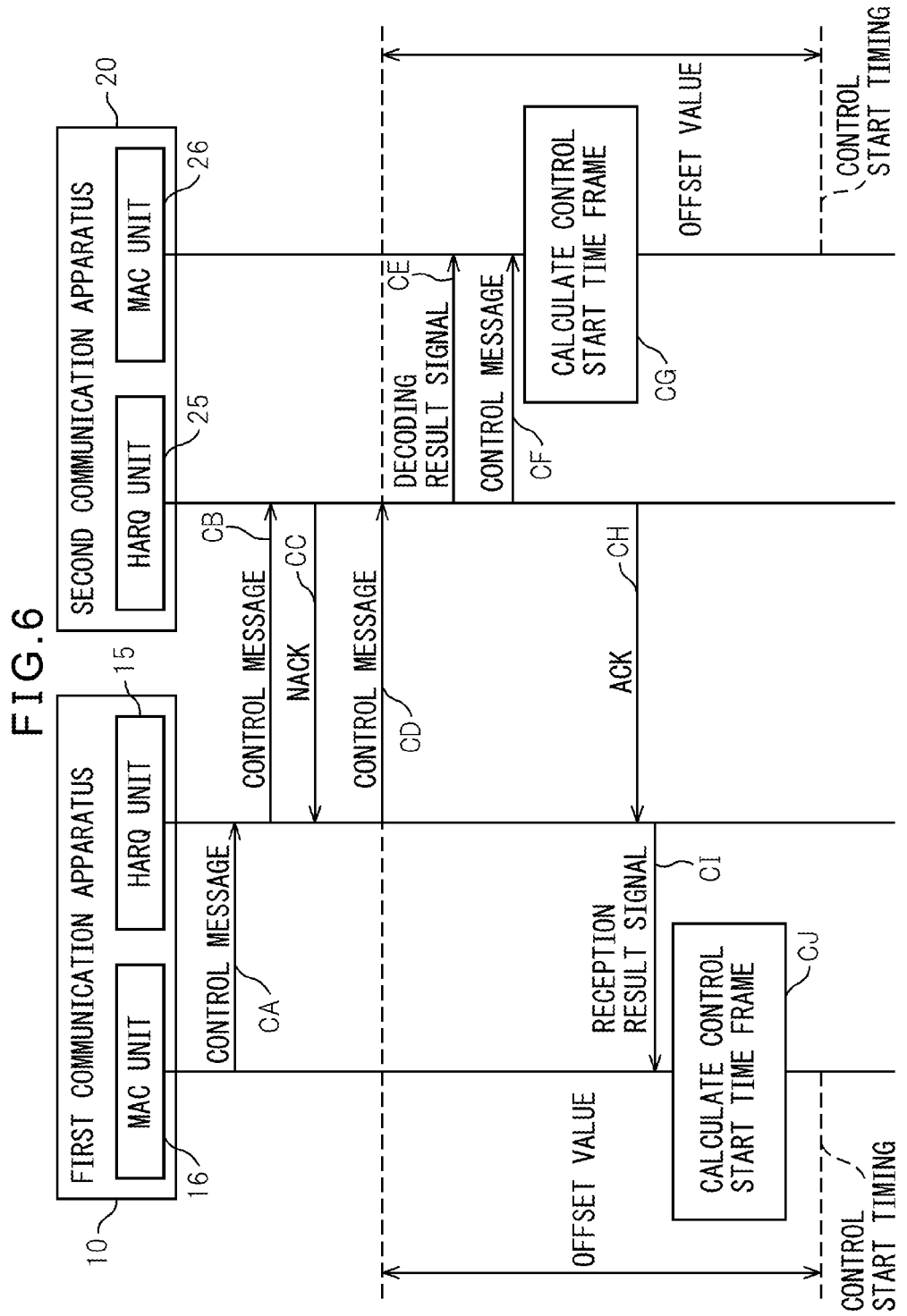
FIG. 6 is a diagram illustrating a communication method for use in the communication system depicted in FIG. 5.

FIG. 6 is a diagram illustrating a communication method for use in the communication system depicted in FIG. 5. In an alternative embodiment, the following operations CA to CJ may be implemented as steps.

In operation CA, the MAC unit 16 generates a control message and passes it to the HARQ unit 15. In operation CA, the HARQ unit 15 transmits the control message to the HARQ unit 25 in the second communication apparatus 20.

The HARQ unit 25 tries to receive the control message. If the control message has been received correctly, the HARQ unit 25 passes it to the MAC unit 26 and, at the same time, returns an ACK signal to the HARQ unit 15 in the first communication apparatus 10. On the other hand, if the control message has not been received correctly, a NACK signal is returned to the HARQ unit 15 in the first communication apparatus 10 to request retransmission of the control message. In the example of FIG. 6, the HARQ unit 25 returns the NACK signal to the HARQ unit 15 in operation CC.

The HARQ unit 15 that received the NACK signal retransmits the control message in operation CD. In the example of FIG. 6, the HARQ unit 25 successfully receives the retransmitted control message. In operation CE, the HARQ unit 25 sends the decoding result signal indicating successful reception of the control message to the MAC unit 26. In operation CF, the HARQ unit 25 passes the received control message to the MAC unit 26.

In operation CG, the MAC unit 26 calculates the control start timing at which the control commanded by the control message is to be started, by adding the predetermined offset value to the time corresponding to the time frame at which the control message was correctly received. In operation CH, the HARQ unit 25 returns the ACK signal to the HARQ unit 15.

Operations CE to CH may be carried out in any order, as long as operation CE is carried out before operation CG. If the control message to be passed in operation CF contains the predetermined offset value, operation CF also is carried out before operation CG.

The ACK signal transmitted from the second communication apparatus is received by the HARQ unit 15. In operation CI, the HARQ unit 15 sends a reception result signal indicating the reception of the ACK signal to the MAC unit 16. In operation CJ, the MAC unit 16 calculates the control start timing. More specifically, the MAC unit 16 calculates the control start timing by adding the predetermined offset value to the time corresponding to the time frame at which the control message whose correct reception has been confirmed by the ACK signal received in operation CH was transmitted, i.e., the time frame at which the control message was transmitted in operation CD.

According to the present embodiment, in the communication system that utilizes HARQ for transmission of the control message, if the control message has been transmitted successfully within a number of retransmissions smaller than the maximum allowable number of retransmissions, the control start timing can be advanced compared with the prior art.

The predetermined offset value which, when calculating the control start timing, is added to the time corresponding to the time frame at which the control message was correctly transmitted, may be stored in the control message and transmitted from the first communication apparatus 10 to the second communication apparatus 20. For example, for each control message, the predetermined offset value may be stored in the control message and transmitted from the first communication apparatus 10 to the second communication apparatus 20. The predetermined offset value may be determined for each control message. This also applies to other embodiments described herein.

The predetermined offset value may be stored in a control message other than the control message for which the control start timing is calculated, and may be transmitted in advance from the first communication apparatus 10 to the second communication apparatus 20 or from the second communication apparatus 20 to the first communication apparatus 10. By thus transferring the predetermined offset value between the first communication apparatus 10 and the second communication apparatus 20, the predetermined offset value may be shared between the first communication apparatus 10 and the second communication apparatus 20. The predetermined offset value may be stored in advance as a preset value in both the first communication apparatus 10 and the second communication apparatus 20. This also applies to other embodiments described herein.

Further, the period defined by the predetermined offset value may be set longer than the retransmission period allowed for the HARQ unit 15 to retransmit the control message. After the control message has been received correctly, if the same control message is received again before the control start timing arrives, the MAC unit 26 may recalculate the control start timing by adding the predetermined offset value to the time corresponding to the time frame at which the control message was correctly received again.

Figure 7:
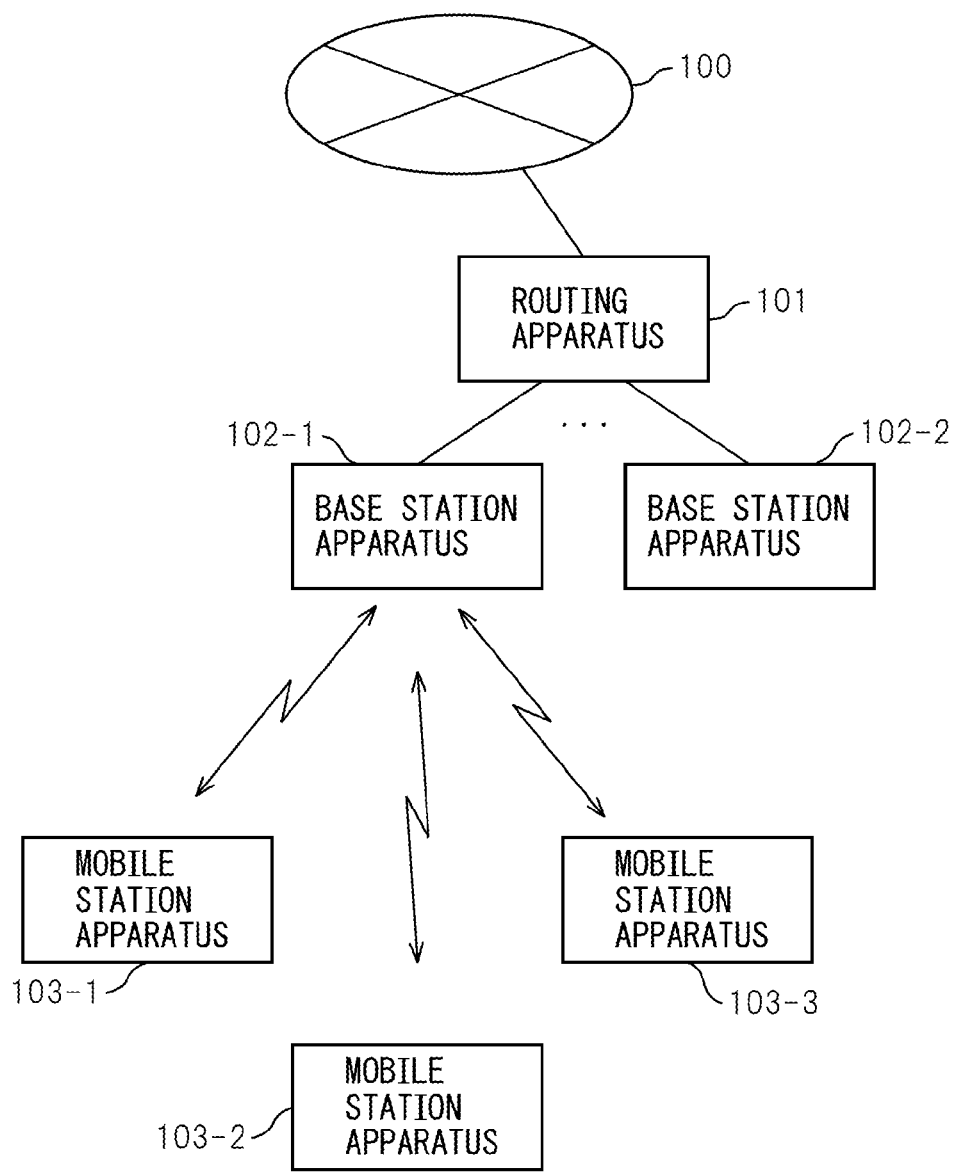
FIG. 7 is a diagram illustrating a third configuration example of a communication system.

Next, a description will be described of an embodiment of a communication system in which the first communication apparatus 10 is a base station apparatus and the second communication apparatus 20 is a mobile station apparatus. That is, in this embodiment, the control message is transmitted from the base station apparatus to the mobile station apparatus. FIG. 7 is a diagram illustrating a third configuration example of a communication system. The communication system 50 includes a network 100, a routing apparatus 101, base station apparatuses 102-1 and 102-2, and mobile station apparatuses 103-1 to 103-3. The communication system 50 may be, for example, a system conforming to WiMAX (Worldwide Interoperability for Microwave Access) defined in the IEEE 802.16 standards.

In the following description, the base station apparatuses 102-1 and 102-2 may be collectively referred to as the "base station apparatus 102". Further, in the following description, the mobile station apparatuses 103-1 to 103-3 may be collectively referred to as the "mobile station apparatus 103". The base station apparatus 102 is given as an example of the first communication apparatus described in the appended claims. The mobile station apparatus 103 is given as an example of the second communication apparatus described in the appended claims. The control message transmitted from the base station apparatus 102 to the mobile station apparatus 103 is given as an example of the control signal described in the appended claims.

The routing apparatus 101 is connected to the network 100 as well as to the plurality of base station apparatuses 102-1 and 102-2. The routing apparatus 101 performs routing for packet data to be transmitted from the base station apparatus 102 to the mobile station apparatus 103 and for packet data to be transmitted from the mobile station apparatus 103 to the base station apparatus 102. Configuration examples of the base station apparatus 102 and the mobile station apparatus 103 will be described below.

Figure 8:
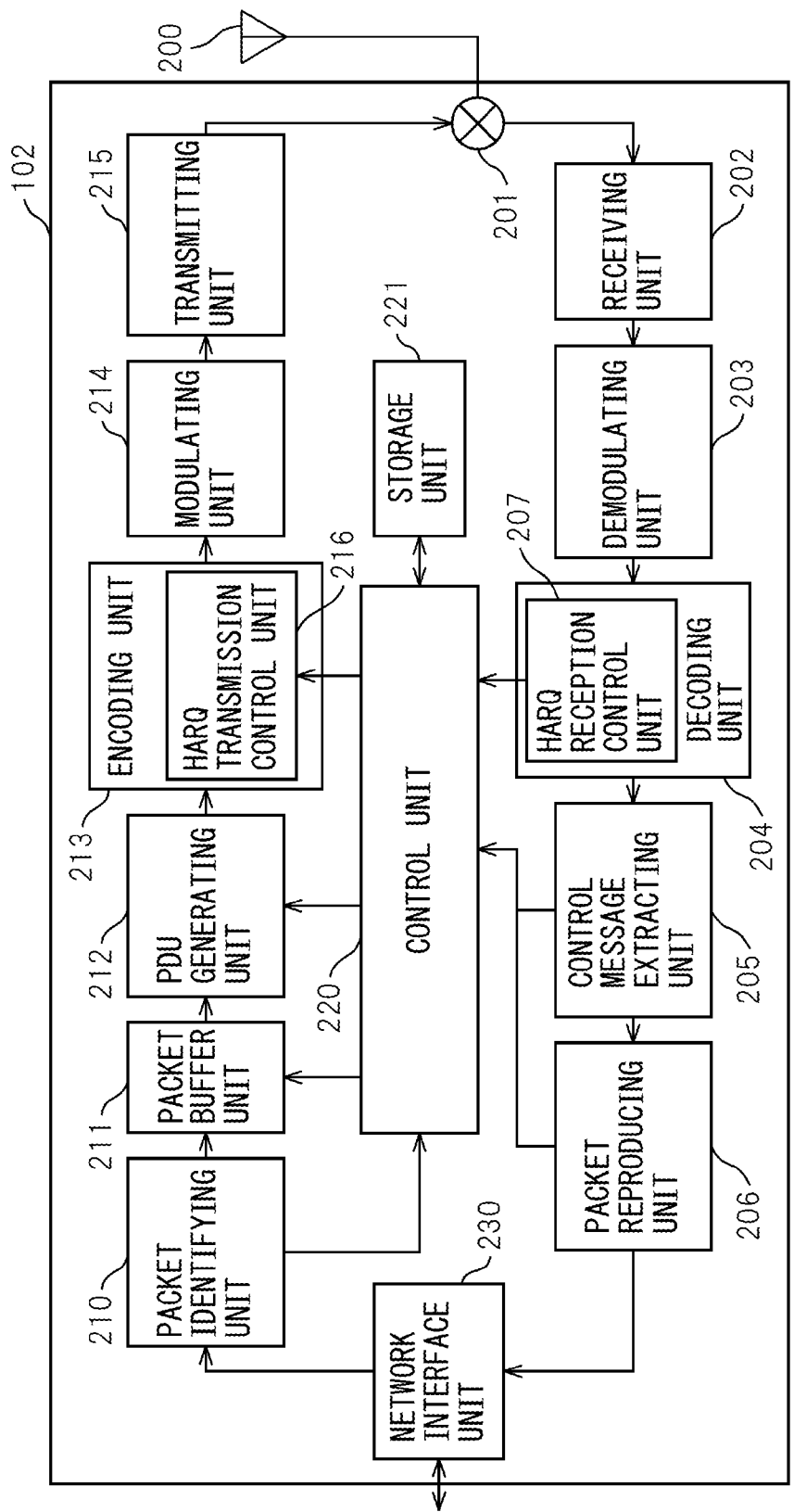
FIG. 8 is a diagram illustrating a configuration example of a base station apparatus depicted in FIG. 7.

FIG. 8 is a diagram illustrating a configuration example of the base station apparatus 102 depicted in FIG. 7. The base station apparatus 102 includes an antenna 200 and a duplexer 201. The receiving section of the base station apparatus 102 includes a receiving unit 202, a demodulating unit 203, a decoding unit 204, a control message extracting unit 205, and a packet reproducing unit 206. The decoding unit 204 includes a HARQ reception control unit 207.

The transmitting section of the base station apparatus 102 includes a packet identifying unit 210, a packet buffer unit 211, a PDU (Protocol Data Unit) generating unit 212, an encoding unit 213, a modulating unit 214, and a transmitting unit 215. The encoding unit 213 includes a HARQ transmission control unit 216. The base station apparatus 102 further includes a control unit 220, a storage unit 221, and a network interface unit 230.

The HARQ transmission control unit 216 is given as an example of the transmitting unit described in the appended claims. The control unit 220 is given as an example of the start timing determining unit of the first communication apparatus described in the appended claims.

The antenna 200 is used to transmit and receive radio communication signals transferred between the base station apparatus 102 and the mobile station apparatus 103. The duplexer 201 is used so as to share the same antenna 200 between the receiving section and the transmitting section.

The receiving unit 202 receives the radio signal transmitted from the mobile station apparatus 103. The demodulating unit 203 demodulates the signal received by the receiving unit 202. The decoding unit 204 decodes the demodulated signal. The control message extracting unit 205 extracts the control message from the decoded data, and supplies it to the control unit 220. The control message may be, for example, a MOB_SLP-REQ message defined in the IEEE 802.16 standards.

The control message extracting unit 205 further extracts other data such as user data from the decoded data, and transfers it to the packet reproducing unit 206. The packet reproducing unit 206 packetizes the data received from the control message extracting unit 205, and supplies the packetized data to the network interface unit 230.

The HARQ reception control unit 207 decodes the demodulated signal received from the demodulating unit 203. In the following description, the encoded data or the data before decoding may be referred to as the "HARQ data". Based on the result of the decoding of the HARQ data, the HARQ reception control unit 207 determines whether the control message or the user data has been successfully received or not. That is, the HARQ reception control unit 207 determines whether the control message or the user data has been correctly received or not.

If the reception has been successful, the HARQ reception control unit 207 transfers the control message or the user data to the control message extracting unit 205. Further, the HARQ reception control unit 207 through the control unit 220 instructs the HARQ transmission control unit 216 in the encoding unit 213 to return an ACK signal to the mobile station apparatus 103. The HARQ reception control unit 207 passes to the control unit 220 the decoding result signal that indicates the result of the decoding of the HARQ data received from the mobile station apparatus 103.

If the reception has failed, the HARQ reception control unit 207 through the control unit 220 instructs the HARQ transmission control unit 216 in the encoding unit 213 to return a NACK signal to the mobile station apparatus 103.

The network interface unit 230 forms an interface to the routing apparatus 101 depicted in FIG. 7. In the present embodiment, the network interface unit 230 performs interfacing of packet communications with the routing apparatus 101.

The packet identifying unit 210 identifies the IP (Internet Protocol) address contained in the packet data received via the network interface unit 230. Based on the IP address, the packet identifying unit 210 identifies the destination mobile station apparatus 103 of the packet data. The packet identifying unit 210 may identify the destination mobile station apparatus 103 of the packet data in accordance, for example, with a prestored association between the IP address of the mobile station apparatus 103 and the identification (ID) information of the mobile station apparatus 103.

The packet identifying unit 210 acquires QoS (Quality of Service) information associated with the ID of the destination mobile station apparatus 103. The packet identifying unit 210 may acquire the QoS information associated with the ID of the destination mobile station apparatus 103 in accordance, for example, with a prestored association between the QoS information for the mobile station apparatus 103 and the ID of the mobile station apparatus 103. The packet identifying unit 210 sends the ID of the mobile station apparatus 103, the QoS information, and the file size of the packet data to the control unit 220 and requests the control unit 220 to assign a frequency band for the transmission of the packet data. The packet identifying unit 210 passes the packet data, received via the network interface unit 230, to the packet buffer unit 211 for storage.

The control unit 220 receives from the packet identifying unit 210 a band assignment request for the downlink traffic, i.e., the traffic in the direction from the base station apparatus 102 to the mobile station apparatus 103. The control unit 220 selects the mobile station apparatus 103 to which the frequency band is to be assigned, in accordance with the QoS of the destination mobile station apparatus 103. Then, the control unit 220 instructs the packet buffer unit 211 and the PDU generating unit 212 to schedule the transmission of the user data. Further, the control unit 220 creates the control message to be transmitted to the mobile station apparatus 103. The control message as well as the user data is transmitted to the mobile station apparatus 103.

The control unit 220 also performs processing for the control message received from the mobile station apparatus 103. For example, the control unit 220 performs processing for the registration of the functions supported by the mobile station apparatus 103, authentication, key generation and exchange, and management of radio channels. The control unit 220 is connected to the storage unit 221. The storage unit 221 stores various kinds of data that the base station apparatus 102 needs to store. For example, the function information of the mobile station apparatus 103, authentication information, key information, radio channel information, connection QoS information, etc., contained in the control message received from the mobile station apparatus 103, are stored in the storage unit 221. The storage unit 221 also stores information concerning the usage conditions of the resources of the base station apparatus 102 in order to manage the usage conditions of the resources at the base station apparatus 102.

The PDU generating unit 212 generates PDU data so that the transmit data will be stored within a radio frame that is formed using the period of a synchronization preamble signal as reference timing. The transmit data includes at least either the user data or the control message.

The PDU generating unit 212 passes the generated PDU to the encoding unit 213. The encoding unit 213 generates the HARQ data by encoding the PDU data. The encoding applied here by the encoding unit 213 is, for example, error-correction coding. The modulating unit 214 modulates the HARQ data. The transmitting unit 215 transmits out the modulated HARQ data as a radio signal from the antenna 200.

The HARQ transmission control unit 216 temporarily buffers the HARQ data to be transmitted. When the HARQ reception control unit 207 has received an ACK signal from the destination mobile station apparatus 103, or when the HARQ data has been transmitted the maximum allowable number of times, the HARQ transmission control unit 216 deletes the buffered HARQ data. When the HARQ reception control unit 207 has received a NACK signal from the destination mobile station apparatus 103, the HARQ transmission control unit 216 retransmits the HARQ data.

When the ACK signal or NACK signal is received from the mobile station apparatus 103, the HARQ reception control unit 207 sends a reception result signal to the control unit 220 to report the reception of the signal. The control unit 220, based on the reception result signal, instructs the HARQ transmission control unit 216 to discard or retransmit the buffered HARQ data.

Next, a description will be given of how the start timing for starting the control commanded by the control message is determined when the control message is transmitted to the mobile station apparatus 103. In the following description, the radio frame number of the radio frame with which the control commanded by the control message is started may be referred to as the "control start frame number".

Figure 9:
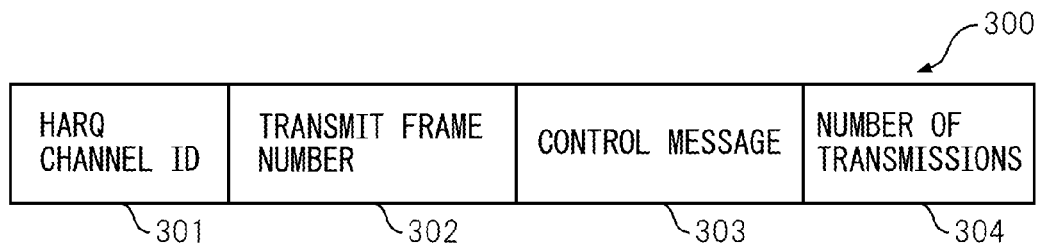
FIG. 9 is a diagram illustrating one example of the structure of a control message transmission management table.

The storage unit 221 stores a control message transmission management table. FIG. 9 is a diagram illustrating one example of the structure of the control message transmission management table. The control message transmission management table 300 carries a "HARQ channel ID" field 301, a "transmit frame number" field 302, a "control message" field 303, and a "number of transmissions" field 304.

The "HARQ channel ID" field 301 stores a HARQ channel ID as identification information for identifying each HARQ transaction performed between the base station apparatus 102 and the mobile station apparatus 103. The "transmit frame number" field 302 stores the radio frame number of the radio frame at which the HARQ data was last transmitted. The "control message" field 303 stores the contents of the control message carried in the HARQ data. The "number of transmissions" field 304 stores the number of transmissions of the HARQ data.

When an ACK signal is received from any one of the mobile station apparatuses 301, the HARQ reception control unit 207 sends a reception result signal to notify the control unit 220 of the reception of the ACK signal. When the reception result signal reporting the reception of the ACK signal is received for a given HARQ transaction, the control unit 220 retrieves from the control message transmission management table 300 the radio frame number stored in the transmit frame number field 302 for that given HARQ transaction. The control unit 220 calculates the control start frame number by adding a predetermined offset value to the thus retrieved radio frame number.

On the other hand, when a NACK signal is received from any one of the mobile station apparatuses 301, the HARQ reception control unit 207 sends a reception result signal to notify the control unit 220 of the reception of the NACK signal. When the reception result signal reporting the reception of the NACK signal is received for a given HARQ transaction, the control unit 220 instructs the HARQ transmission control unit 216 to retransmit the HARQ data of that HARQ transaction. The control unit 220 updates the values stored in the transmit frame number field 302 and the number of transmissions field 304 for that given HARQ transaction in the control message transmission management table 300.

Figure 10:
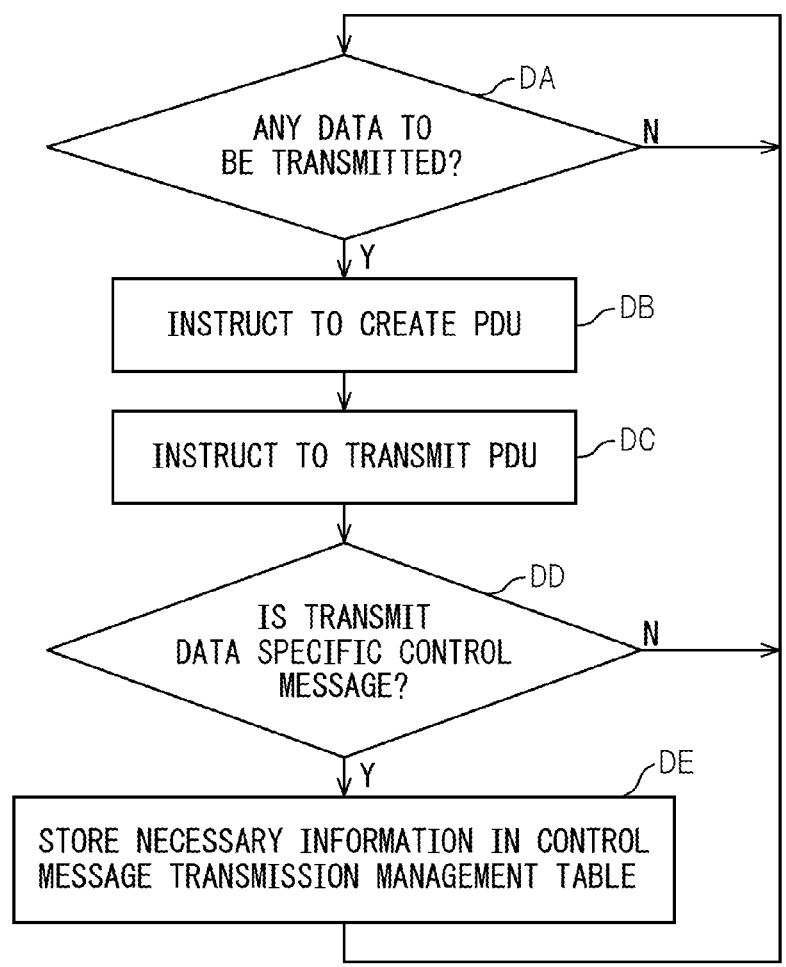
FIG. 10 is a diagram (part 1) illustrating the processing performed by a control unit depicted in FIG. 8.
Figure 11:
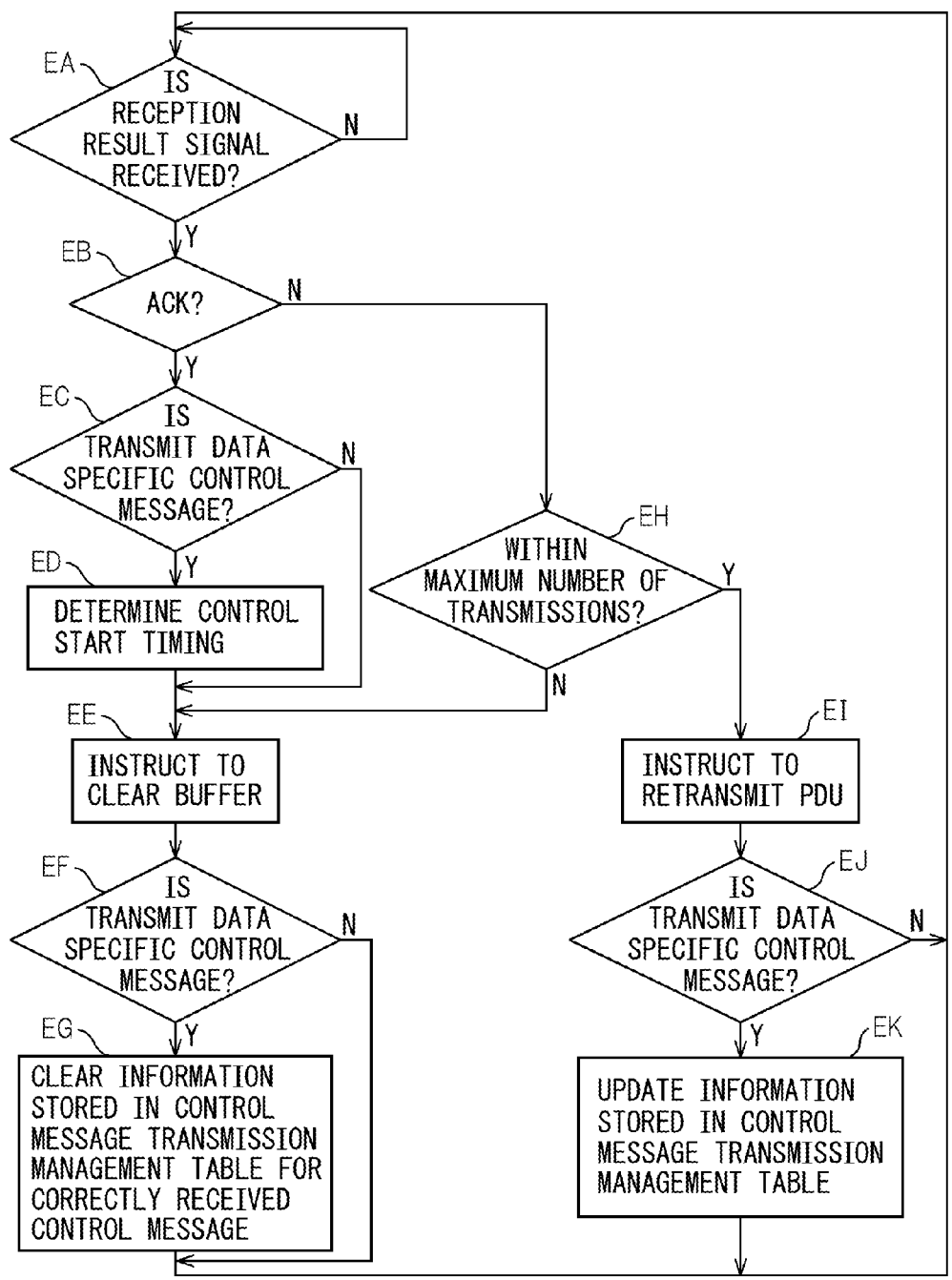
FIG. 11 is a diagram (part 2) illustrating the processing performed by the control unit depicted in FIG. 8.
Figure 12:
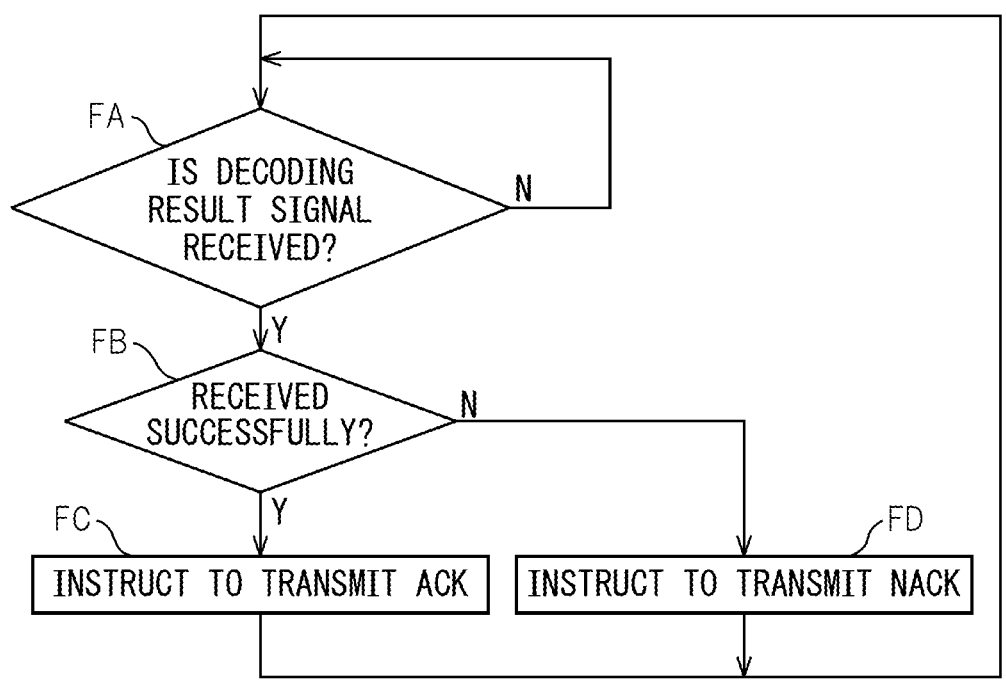
FIG. 12 is a diagram (part 3) illustrating the processing performed by the control unit depicted in FIG. 8.

FIG. 10 to FIG. 12 are diagrams illustrating the processing performed by the control unit 220 depicted in FIG. 8. FIG. 10 illustrates the processing performed when transmitting a new PDU. In an alternative embodiment, the following operations DA to DE may be implemented as steps.

In operation DA, the control unit 220 checks to see if there is any new data to be transmitted. If there is any data to be transmitted (Y in operation DA), the control unit 220 proceeds to operation DB. If there is no data to be transmitted (N in operation DA), the control unit 220 returns to operation DA.

In operation DB, the control unit 220 instructs the PDU generating unit 212 to generate a PDU that contains the transmit data. In operation DC, the control unit 220 instructs the encoding unit 213, the modulating unit 214, and the transmitting unit 215 to encode, modulate, and transmit the PDU, respectively.

In operation DD, the control unit 220 determines whether the transmit data is a specific control message or not. Whether the transmit data is the specific control message or not may be determined according to whether the message type carried in the control message coincides with a predefined specific value. If the transmit data is the specific control message (Y in operation DD), the control unit 220 proceeds to operation DE. If the transmit data is not the specific control message (N in operation DD), the control unit 220 returns to operation DA.

In operation DE, the control unit 220 stores, in the control message transmission management table 300, the HARQ channel ID of the HARQ transaction in which the control message is transmitted, the radio frame number at which the control message was transmitted, and the contents of the control message. Further, the control unit 220 stores the number of transmissions="1" in the control message transmission management table 300. After that, the control unit 220 returns to operation DA.

FIG. 11 illustrates the processing performed when the reception result signal is received from the HARQ reception control unit 207. In an alternative embodiment, the following operations EA to EK may be implemented as steps.

In operation EA, the control unit 220 determines whether the reception result signal is received from the HARQ reception control unit 207. If the reception result signal is received (Y in operation EA), the control unit 220 proceeds to operation EB. If no reception result signal is received (N in operation EA), the control unit 220 returns to operation EA.

In operation EB, the control unit 220 checks to see whether the reception result signal indicates the reception of an ACK signal. If the reception result signal indicates the reception of an ACK signal (Y in operation EB), the control unit 220 proceeds to operation EC. On the other hand, if the reception result signal indicates the reception of a NACK signal (N in operation EB), the control unit 220 proceeds to operation EH.

In operation EC, the control unit 220 determines whether the transmit data of the HARQ transaction for which the ACK signal was received is a specific control message. Whether the transmit data is the specific control message or not may be determined according to whether the message type carried in the control message coincides with a predefined specific value. If the transmit data is the specific control message (Y in operation EC), the control unit 220 proceeds to operation ED. If the transmit data is not the specific control message (N in operation EC), the control unit 220 proceeds to operation EE.

In operation ED, the control unit 200 adds a predetermined offset value to the radio frame number stored in the transmit frame number field 302 in the control message transmission management table 300, and takes the thus calculated radio frame number as the control start frame number.

In operation EE, the control unit 220 instructs the HARQ transmission control unit 216 to clear the buffered HARQ data. In operation EF, the control unit 220 determines whether the transmit data is a specific control message or not. Whether the transmit data is the specific control message or not may be determined according to whether the message type carried in the control message coincides with a predefined specific value. If the transmit data is the specific control message (Y in operation EF), the control unit 220 proceeds to operation EG. If the transmit data is not the specific control message (N in operation EF), the control unit 220 returns to operation EA.

In operation EG, the control unit 220 clears the information stored in the control message transmission management table 300 for the control message whose correct reception has been confirmed by the reception result signal. After that, the control unit 220 returns to operation EA.

On the other hand, in operation EH, the control unit 220 checks whether or not the number of transmissions in the HARQ transaction for which the NACK signal was received lies within the maximum allowable number of transmissions. If the number of transmissions lies within the maximum allowable number of transmissions (Y in operation EH), the control unit 220 proceeds to operation EI. If the number of transmissions exceeds the maximum allowable number of transmissions (N in operation EH), the control unit 220 proceeds to operation EE.

In operation EI, the control unit 220 instructs the HARQ transmission control unit 216 to retransmit the buffered encoded data, i.e., the HARQ data. In operation EJ, the control unit 220 determines whether the transmit data is a specific control message or not. Whether the transmit data is the specific control message or not may be determined according to whether the message type carried in the control message coincides with a predefined specific value. If the transmit data is the specific control message (Y in operation EJ), the control unit 220 proceeds to operation EK. If the transmit data is not the specific control message (N in operation EK), the control unit 220 returns to operation EA.

In operation EK, the control unit 220 updates the values stored in the transmit frame number field 302 and the number of transmissions field 304 in the control message transmission management table 300 for the HARQ transaction in which the PDU was retransmitted FIG. 12 illustrates the processing performed when the decoding result signal is received from the decoding unit 207. In an alternative embodiment, the following operations FA to FD may be implemented as steps.

In operation FA, the control unit 220 determines whether the decoding result signal is received from the HARQ reception control unit 207. If the decoding result signal is received (Y in operation FA), the control unit 220 proceeds to operation FB. If no decoding result signal is received (N in operation FA), the control unit 220 returns to operation FA.

In operation FB, the control unit 220 checks to see whether the decoding result signal indicates successful decoding. If the decoding has been successful (Y in operation FB), the control unit 220 proceeds to operation FC. On the other hand, if the decoding has failed (N in operation FB), the control unit 220 proceeds to operation FD.

In operation FC, the control unit 220 instructs the HARQ transmission control unit 216 to transmit an ACK signal. After that, the control unit 220 returns to operation FA. In operation FD, the control unit 220 instructs the HARQ transmission control unit 216 to transmit a NACK signal. After that, the control unit 220 returns to operation FA.

Figure 13:
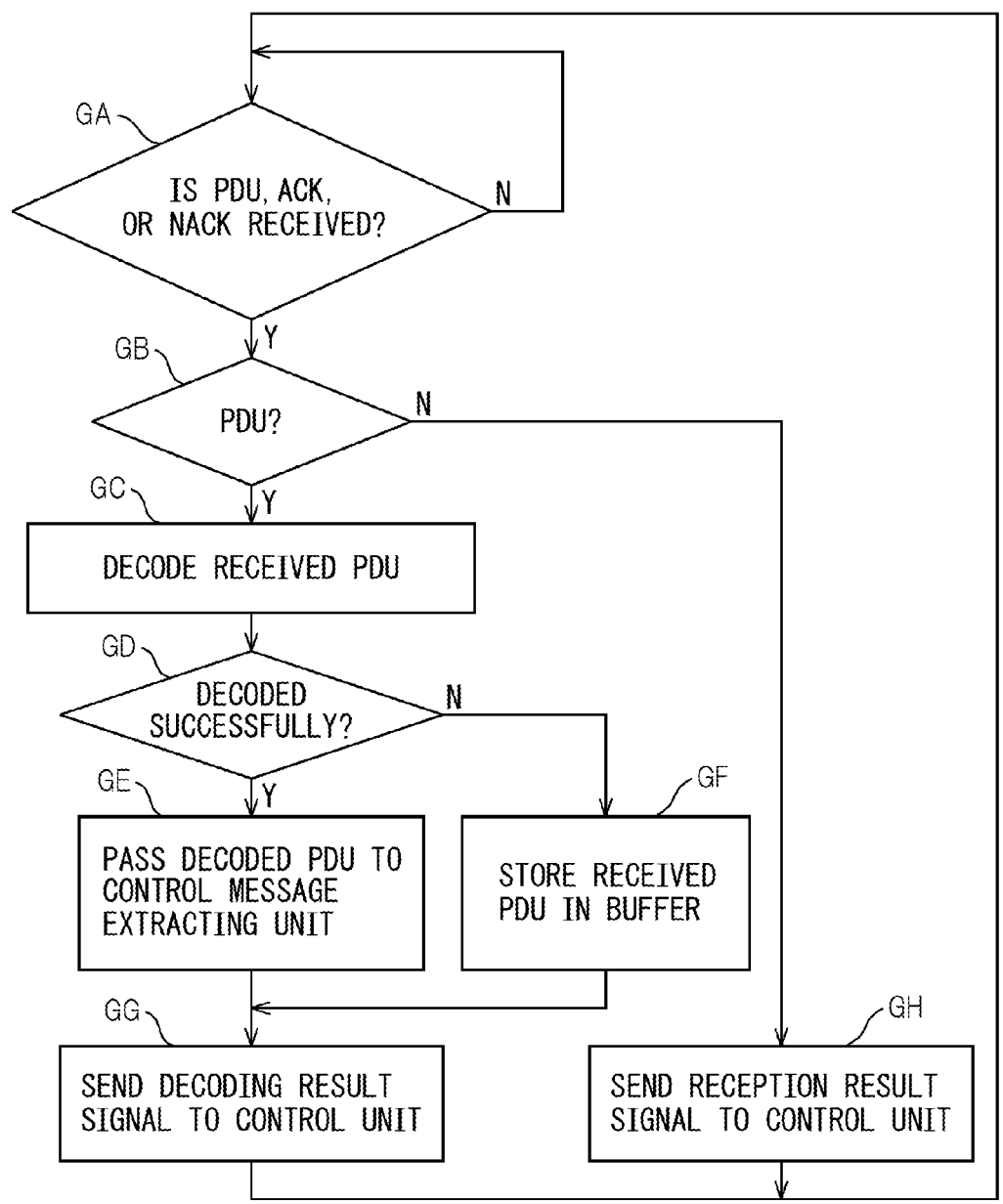
FIG. 13 is a diagram illustrating the processing performed by a HARQ reception control unit depicted in FIG. 8.

FIG. 13 is a diagram illustrating the processing performed by the HARQ reception control unit 207 depicted in FIG. 8. In an alternative embodiment, the following operations GA to GH may be implemented as steps.

In operation GA, the HARQ reception control unit 207 determines whether the encoded PDU, i.e., the HARQ data, or the ACK signal or NACK signal is received or not. If any one of these signals is received (Y in operation GA), the HARQ reception control unit 207 proceeds to operation GB. If none of these signals is received (N in operation GA), the HARQ reception control unit 207 returns to operation GA.

In operation GB, the HARQ reception control unit 207 determines whether the received signal is the encoded PDU or not. If the received signal is the encoded PDU (Y in operation GB), the HARQ reception control unit 207 proceeds to operation GC. If the received signal is the ACK signal or NACK signal (N in operation GB), the HARQ reception control unit 207 proceeds to operation GH.

In operation GC, the HARQ reception control unit 207 decodes the received PDU. If the currently received PDU is one that has been retransmitted, the HARQ reception control unit 207 combines the currently received PDU with the previously received and buffered PDU and decodes the thus combined data.

In operation GD, the HARQ reception control unit 207 determines whether the PDU has been decoded successfully or not. The HARQ reception control unit 207 may determine whether the decoding has been successful or not, for example, by calculating the cyclic redundancy code appended to the PDU. If the decoding has been successful (Y in operation GD), the HARQ reception control unit 207 proceeds to operation GE. On the other hand, if the decoding has failed (N in operation GD), the HARQ reception control unit 207 proceeds to operation GF.

In operation GE, the HARQ reception control unit 207 passes the decoded PDU to the control message extracting unit 205. After that, the HARQ reception control unit 207 proceeds to operation GG.

In operation GF, the HARQ reception control unit 207 stores the received PDU in its buffer. After that, the HARQ reception control unit 207 proceeds to operation GG.

In operation GG, the HARQ reception control unit 207 sends the decoding result signal indicating the result of the decoding done in operation GC to the control unit 220. After that, the HARQ reception control unit 207 returns to operation GA.

On the other hand, in operation GH, the HARQ reception control unit 207 sends the reception result signal to the control unit 222 to report the reception of the ACK or NACK signal. After that, the HARQ reception control unit 207 returns to operation GA.

Figure 14:
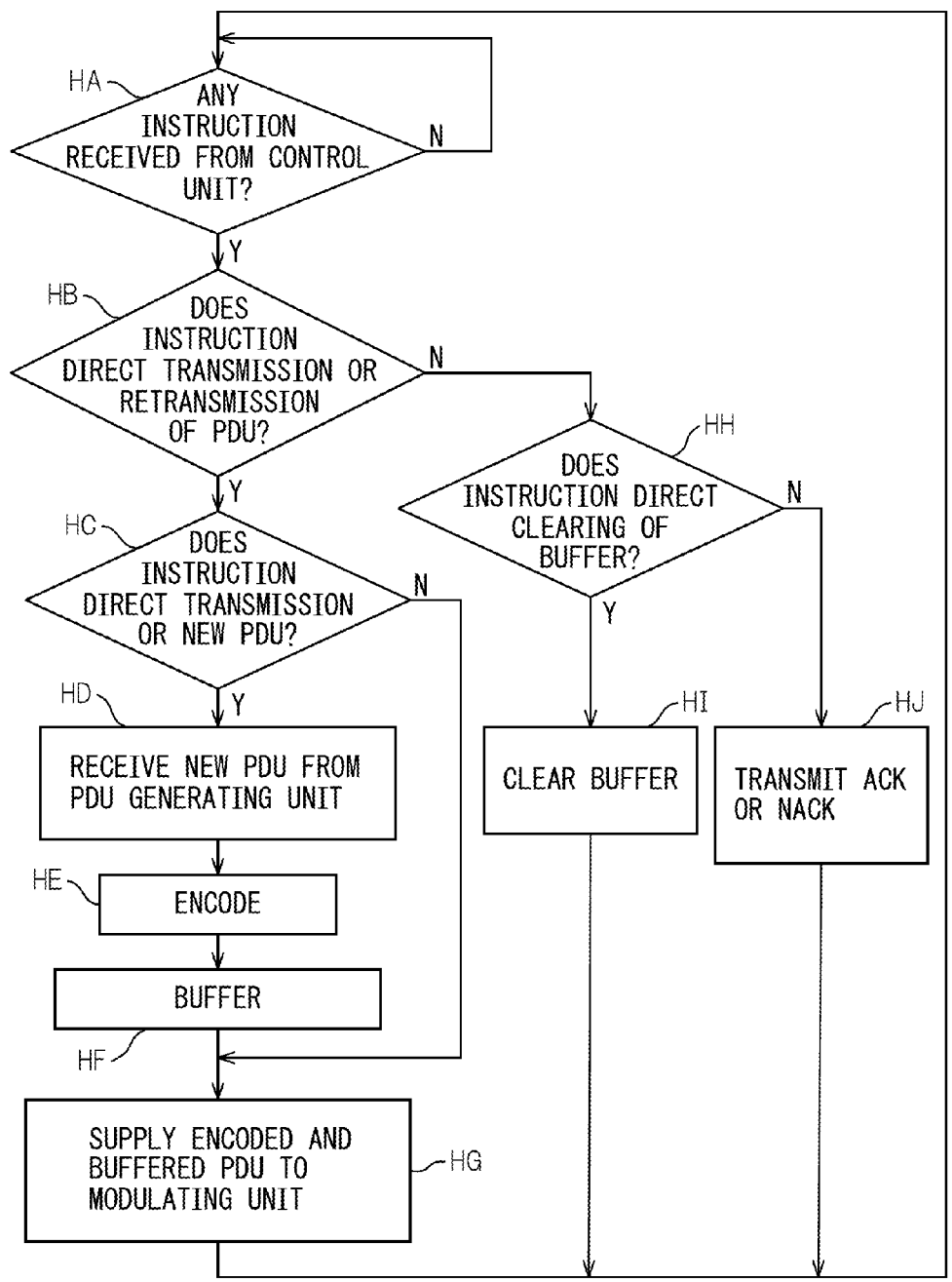
FIG. 14 is a diagram illustrating the processing performed by an encoding unit depicted in FIG. 8.

FIG. 14 is a diagram illustrating the processing performed by the encoding unit 213 depicted in FIG. 8. In an alternative embodiment, the following operations HA to HJ may be implemented as steps.

In operation HA, the encoding unit 213 determines whether any instruction is received from the control unit 220. Examples of the instruction from the control unit 220 include (instruction 1) directing the transmission of a new PDU, (instruction 2) directing the retransmission of the current PDU, (instruction 3) directing the clearing of the buffer storing the transmitted PDU, and (instruction 4) directing the transmission of an ACK signal or NACK signal.

If any instruction is received from the control unit 220 (Y in operation HA), the encoding unit 213 proceeds to operation HB. If no instruction is received from the control unit 220 (N in operation HA), the encoding unit 213 returns to operation HA.

In operation HB, the encoding unit 213 determines whether the received instruction is one that directs the transmission of a PDU, i.e., whether or not the received instruction is instruction 1 or instruction 2. If the received instruction is one that directs the transmission of a PDU (Y in operation HB), the encoding unit 213 proceeds to operation HC. If the received instruction is not one that directs the transmission of a PDU (N in operation HB), the encoding unit 213 proceeds to operation HH.

In operation HC, the encoding unit 213 determines whether the received instruction is one that directs the transmission of a new PDU (instruction 1). If the received instruction is one that directs the transmission of a new PDU (Y in operation HC), the encoding unit 213 proceeds to operation HD. If the received instruction is not one that directs the transmission of a new PDU (N in operation HC), the encoding unit 213 proceeds to operation HG.

In operation HD, the encoding unit 213 receives a new PDU from the PDU generating unit 212. In operation HE, the encoding unit 213 generates HARQ data by encoding the PDU data. In operation HF, the HARQ transmission control unit 216 in the encoding unit 213 buffers the HARQ data. In operation HG, the encoding unit 213 supplies the thus buffered HARQ data to the modulating unit 214. After that, the encoding unit 213 returns to operation HA.

On the other hand, in operation HH, the encoding unit 213 determines whether the received instruction is one that directs the clearing of the buffer storing the transmitted PDU (instruction 3) or not. If the received instruction is one that directs the clearing of the buffer (Y in operation HH), the encoding unit 213 proceeds to operation HI. If the received instruction is not one that directs the clearing of the buffer (N in operation HH), the encoding unit 213 proceeds to operation HJ.

In operation HI, the HARQ transmission control unit 216 deletes the buffered HARQ data. After that, the encoding unit 213 returns to operation HA.

When carrying out operation HJ, the received instruction is one that directs the transmission of an ACK signal or NACK signal (instruction 4). The HARQ transmission control unit 216 transmits the ACK signal or NACK signal according to the received instruction. After that, the encoding unit 213 returns to operation HA.

Figure 15:
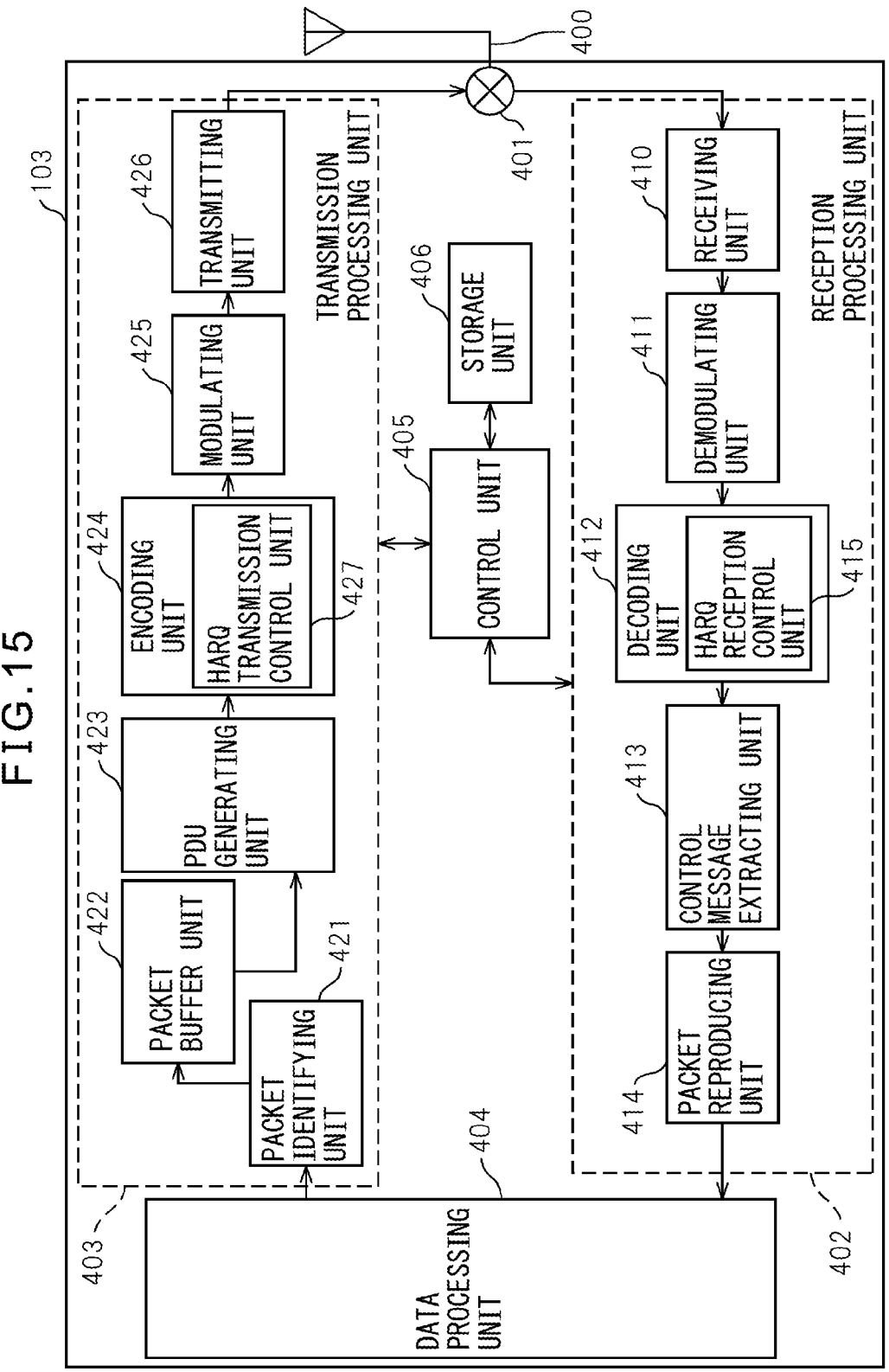
FIG. 15 is a diagram illustrating a configuration example of a mobile station apparatus depicted in FIG. 7.

Next, the configuration and operation of the mobile station apparatus 103 will be described. FIG. 15 is a diagram illustrating a configuration example of the mobile station apparatus 103 depicted in FIG. 7. The mobile station apparatus 103 includes an antenna 400, a duplexer 401, a reception processing unit 402, a transmission processing unit 403, a data processing unit 404, a control unit 405, and a storage unit 406.

The reception processing unit 402 includes a receiving unit 410, a demodulating unit 411, a decoding unit 412, a control message extracting unit 413, and a packet reproducing unit 414. The decoding unit 412 includes a HARQ reception control unit 415.

The transmission processing unit 403 includes a packet identifying unit 421, a packet buffer unit 422, a PDU generating unit 423, an encoding unit 424, a modulating unit 425, and a transmitting unit 426. The encoding unit 424 includes a HARQ transmission control unit 427.

The HARQ transmission control unit 427 is given as an example of the positive acknowledgment transmitting unit described in the appended claims. The control unit 405 is given as an example of the start timing determining unit of the second communication apparatus described in the appended claims.

The antenna 400 is used to transmit and receive radio communication signals transferred between the base station apparatus 102 and the mobile station apparatus 103. The duplexer 401 is used to share the same antenna 400 between the reception processing unit 402 and the transmission processing unit 403.

The receiving unit 410 receives the radio signal transmitted from the base station apparatus 102. The demodulating unit 411 demodulates the signal received by the receiving unit 410. The decoding unit 412 decodes the demodulated signal. The control message extracting unit 413 extracts the control message from the decoded data, and supplies it to the control unit 405. The control message extracting unit 413 further extracts other data such as user data from the decoded data, and transfers it to the packet reproducing unit 414. The packet reproducing unit 414 packetizes the data received from the control message extracting unit 413, and supplies the packetized data to the data processing unit 404.

The HARQ reception control unit 415 generates HARQ data by decoding the demodulated signal received from the demodulating unit 411. Based on the result of the decoding of the HARQ data, the HARQ reception control unit 415 determines whether the control message or the user data has been successfully received or not. That is, the HARQ reception control unit 415 determines whether the control message or the user data has been correctly received or not.

If the reception has been successful, the HARQ reception control unit 415 transfers the control message or the user data to the control message extracting unit 413. Further, the HARQ reception control unit 415 through the control unit 405 instructs the HARQ transmission control unit 427 in the encoding unit 424 to return an ACK signal to the base station apparatus 102. The HARQ reception control unit 415 passes to the control unit 405 the decoding result signal that indicates the result of the decoding of the HARQ data received from the base station apparatus 102.

If the reception has failed, the HARQ reception control unit 415 through the control unit 405 instructs the HARQ transmission control unit 427 to return a NACK signal to the base station apparatus 102.

The data processing unit 404 performs various processing such as outputting voice and displaying various kinds of data carried in the received data. Further, the data processing unit 404 transfers to the packet identifying unit 421 the user data that is desired to be transmitted to the apparatus at the remote end.

The packet identifying unit 421 identifies the IP address contained in the packet data received from the data processing unit 404. Based on the IP address, the packet identifying unit 421 identifies the connection that links between the base station apparatus 102 and the mobile station apparatus 103 and that is to be used for transmission of the packet data received from the processing unit 404. The packet identifying unit 421 may identify the connection to be used for transmission of the packet data, for example, in accordance with a prestored association between the IP address data and the identification (ID) information of the connection.

The packet identifying unit 421 acquires QoS information associated with the ID of the identified connection. The packet identifying unit 421 may acquire the QoS information associated with the ID of the identified connection in accordance, for example, with a prestored association between the QoS information for the connection and the ID of the connection. The packet identifying unit 421 sends the ID of the connection, the QoS information, and the file size of the packet data to the control unit 405 and requests the control unit 405 to transmit out the packet data. The packet identifying unit 421 passes the packet data, received from the data processing unit 404, to the packet buffer unit 422 for storage.

The control unit 405 that received the transmit request from the packet identifying unit 421 makes a request to the base station apparatus 102 for the assignment of a frequency band. When the frequency band is assigned, the control unit 405 instructs the packet buffer unit 422 and the PDU generating unit 423 to transmit out the packet data.

Further, the control unit 405 creates the control message to be transmitted to the base station apparatus 102. The control message may be, for example, a MOB_SLP-REQ message, as earlier stated, or a bandwidth request header (BR header). The control unit 405 instructs the transmission processing unit 403 to transmit the control message to the base station apparatus 102.

The PDU generating unit 423 generates PDU data so that the transmit data will be stored within a radio frame that is formed using, as reference timing, the period of a synchronization preamble signal transmitted from the base station apparatus 102. The transmit data includes at least either the user data or the control message.

The PDU generating unit 423 passes the generated PDU to the encoding unit 424. The encoding unit 424 generates the HARQ data by encoding the PDU data. The encoding applied here by the encoding unit 424 is, for example, error-correction coding. The modulating unit 425 modulates the HARQ data. The transmitting unit 426 transmits out the modulated HARQ data as a radio signal from the antenna 400.

The HARQ transmission control unit 427 temporarily buffers the HARQ data to be transmitted. When the HARQ reception control unit 415 has received an ACK signal from the serving base station apparatus 102, or when the HARQ data has been transmitted the maximum allowable number of times, the HARQ transmission control unit 427 deletes the buffered HARQ data. When the HARQ reception control unit 415 has received a NACK signal from the serving base station apparatus 102, the HARQ transmission control unit 427 retransmits the HARQ data.

When the ACK signal or NACK signal is received from the base station apparatus 102, the HARQ reception control unit 415 sends a reception result signal to the control unit 405 to report the reception of the signal. The control unit 405, based on the reception result signal, instructs the HARQ transmission control unit 427 to discard or retransmit the buffered HARQ data.

The control unit 405 also performs processing for the control messages to be transmitted and received to and from the base station apparatus 102. For example, the control unit 405 performs processing for the registration of the functions supported by the mobile station apparatus 103, authentication, key generation and exchange, and management of radio channels. Based on the uplink band assignment information received from the base station apparatus 102, the control unit 405 controls the transmission processing unit 403 to transmit the user data or control message to the base station apparatus 102. When making a request for the assignment of a frequency band, the control unit 405 instructs the transmission processing unit 403 to transmit to the base station apparatus 102 the BR header of the connection to which the band is to be assigned.

Next, a description will be given of how the control start frame number is determined in the mobile station apparatus 103. The processing that the control unit 405 performs when transmitting a new PDU is the same as the corresponding processing performed by the control unit 220 in the base station apparatus 102, and therefore, will not be described herein. Further, the processing performed by the HARQ reception control unit 415 and the encoding unit 424 is the same as the corresponding processing performed by the HARQ reception control unit 207 and the encoding unit 213, respectively, in the base station apparatus 102, and therefore, will not be described herein.

Figure 16:
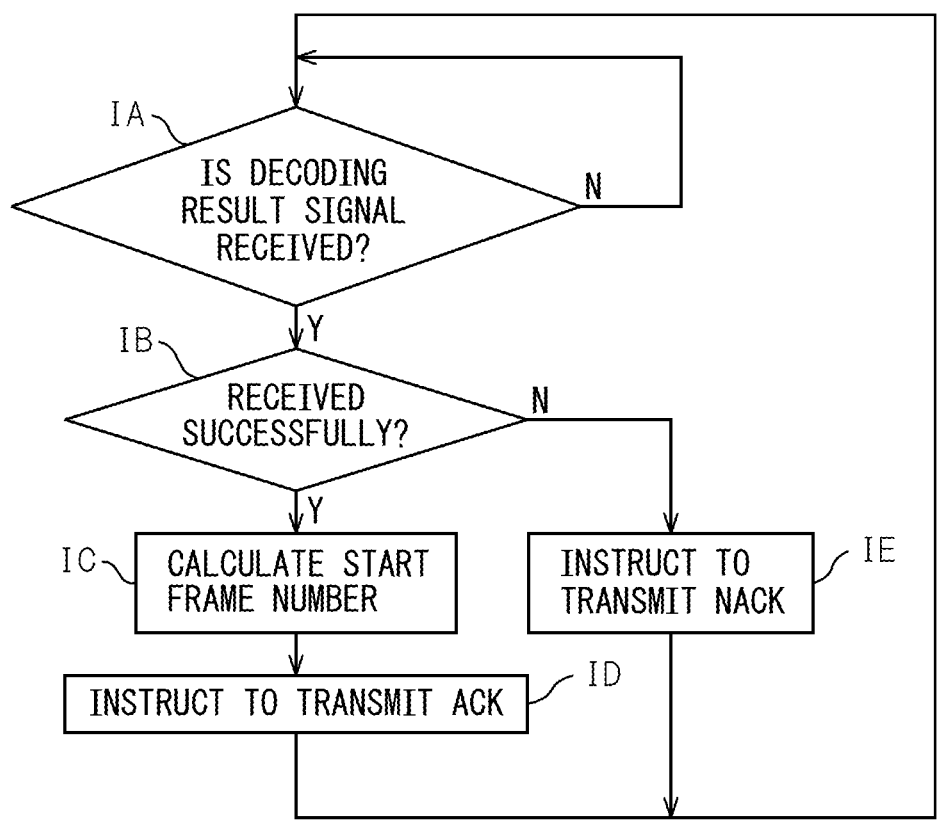
FIG. 16 is a diagram (part 1) illustrating the processing performed by a control unit depicted in FIG. 15.

FIG. 16 is a diagram illustrating the processing that the control unit 405 performs when the decoding result signal is received. In an alternative embodiment, the following operations IA to IE may be implemented as steps.

In operation IA, the control unit 405 determines whether the decoding result signal is received from the HARQ reception control unit 415. If the decoding result signal is received (Y in operation IA), the control unit 405 proceeds to operation IB. If no decoding result signal is received (N in operation IA), the control unit 405 returns to operation IA.

In operation IB, the control unit 405 checks to see whether the decoding result signal indicates successful decoding. If the decoding has been successful (Y in operation IB), the control unit 405 proceeds to operation IC. On the other hand, if the decoding has failed (N in operation IB), the control unit 405 proceeds to operation IE.

In operation IC, the control unit 405 calculates the control start frame number by adding a predetermined offset value to the radio frame number of the radio frame at which the successfully decoded control message was received.

In operation ID, the control unit 405 instructs the HARQ transmission control unit 427 to transmit an ACK signal. After that, the control unit 405 returns to operation IA. In operation IE, the control unit 405 instructs the HARQ transmission control unit 427 to transmit a NACK signal. After that, the control unit 405 returns to operation IA.

Figure 17:
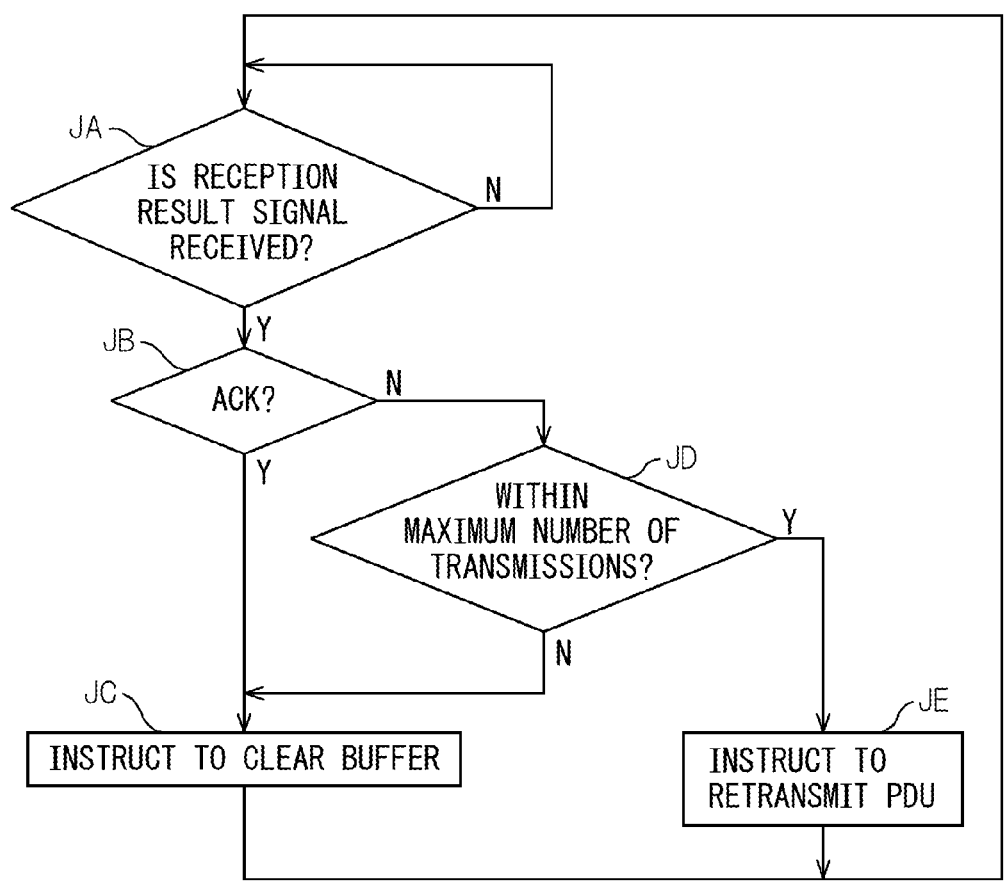
FIG. 17 is a diagram (part 2) illustrating the processing performed by the control unit depicted in FIG. 15.

FIG. 17 illustrates the processing that the control unit 405 performs when the reception result signal is received. In an alternative embodiment, the following operations JA to JE may be implemented as steps.

In operation JA, the control unit 405 determines whether the reception result signal is received from the HARQ reception control unit 415. If the reception result signal is received (Y in operation JA), the control unit 405 proceeds to operation JB. If no reception result signal is received (N in operation JA), the control unit 405 returns to operation JA.

In operation JB, the control unit 405 checks to see whether the reception result signal indicates the reception of an ACK signal. If the reception result signal indicates the reception of an ACK signal (Y in operation JB), the control unit 405 proceeds to operation JC. On the other hand, if the reception result signal indicates the reception of a NACK signal (N in operation JB), the control unit 405 proceeds to operation JD.

In operation JC, the control unit 405 instructs the HARQ transmission control unit 427 to clear the buffered HARQ data. After that, the control unit 405 returns to operation JA.

In operation JD, the control unit 405 checks whether or not the number of transmissions in the HARQ transaction for which the NACK signal was received lies within the maximum allowable number of transmissions. If the number of transmissions lies within the maximum allowable number of transmissions (Y in operation JD), the control unit 405 proceeds to operation JE. If the number of transmissions exceeds the maximum allowable number of transmissions (N in operation JD), the control unit 405 proceeds to operation JC.

In operation JE, the control unit 405 instructs the HARQ transmission control unit 427 to retransmit the buffered encoded data, i.e., the HARQ data. After that, the control unit 405 returns to operation JA.

According to the present embodiment, in the communication system that utilizes HARQ to transmit the control message from the base station apparatus to the mobile station apparatus, the control commanded by the control message can be started at an earlier radio frame than is possible with the prior art.

In the above embodiment, the period defined by the predetermined offset value may be set longer than the retransmission period allowed for the HARQ transmission control unit 216 in the base station apparatus 102 to retransmit the control message. After the control message has been received correctly, if the same control message is received again before the control start timing arrives, the control unit 405 in the mobile station apparatus 103 may recalculate the control start timing by adding the predetermined offset value to the time corresponding to the time frame at which the control message was correctly received again.

Further, in the above embodiment, the transmit/receive time of the successfully transmitted control message has been used as the reference time based on which the control start timing is determined in synchronized fashion between the base station apparatus and the mobile station apparatus. However, the reference time may be determined in other ways, as long as synchronization can be achieved between the base station apparatus and the mobile station apparatus. In view of this, the transmit/receive time of the ACK signal, for example, may be used as the reference time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication method for transmitting a control signal from a first communication apparatus to a second communication apparatus, wherein
said first communication apparatus performs a retransmission process in which said control signal is transmitted repeatedly until a positive acknowledgment signal is received or until a termination condition is satisfied, and
said second communication apparatus that received said control signal transmits said positive acknowledgment signal to said first communication apparatus and determines, based on a period of time, a control start timing for starting control commanded by said control signal.

2. The communication method according to claim 1, wherein said first communication apparatus that received said positive acknowledgment signal determines said control start timing based on said period of time.

3. The communication method according to claim 1, wherein said period of time is reported from said first communication apparatus to said second communication apparatus either in advance or by said control signal, or is stored in advance in both said first communication apparatus and said second communication apparatus.

4. The communication method according to claim 1, wherein said period of time is set longer than a retransmission period allowed for retransmission of said control signal in said retransmission process, and wherein
after said control signal has been received correctly, if said control signal is received again before said control start timing arrives, said second communication apparatus determines said control start timing once again based on said period of time.

5. The communication method according to claim 1, wherein said control signal is a signal concerning control that needs synchronization between said first communication apparatus and said second communication apparatus.

6. The communication method according to claim 1, wherein said control signal is a signal for putting said second communication apparatus into a sleep mode.

7. The communication method according to claim 1, wherein said first communication apparatus is a base station apparatus and said second communication apparatus is a mobile station apparatus.

8. A communication apparatus for use in a communication system including a first communication apparatus and a second communication apparatus, as said second communication apparatus, said second communication apparatus comprising:
a positive acknowledgment signal transmitting unit which transmits a positive acknowledgment signal to said first communication apparatus when said second communication apparatus received a control signal; and
a start timing determining unit which, when said second communication apparatus received said control signal, determines, based on a period of time, a control start timing for starting control commanded by said control signal.

9. The communication apparatus according to claim 8, wherein said period of time is reported from said first communication apparatus to said second communication apparatus either in advance or by said control signal, or is stored in advance in both said first communication apparatus and said second communication apparatus.

10. The communication apparatus according to claim 8, wherein said period of time is set longer than a retransmission period allowed for said control signal to be retransmitted from said first communication apparatus, and wherein
after said control signal has been received correctly, if said control signal is received again before said control start timing arrives, said start timing determining unit determines said control start timing once again based on said period of time.

11. The communication apparatus according to claim 8, wherein said first communication apparatus is a base station apparatus and said second communication apparatus is a mobile station apparatus.

12. A communication apparatus for use in a communication system including a first communication apparatus and a second communication apparatus, as said first communication apparatus, said first communication apparatus comprising:
a transmitting unit which performs a retransmission process in which a control signal is transmitted repeatedly until a positive acknowledgment signal indicating correct reception of said control signal by said second communication apparatus is received or until a termination condition is satisfied; and
a start timing determining unit which, when said first communication apparatus received said positive acknowledgment signal, determines, based on a period of time, a control start timing for starting control commanded by said control signal.

13. The communication apparatus according to claim 12, wherein said period of time is reported from said first communication apparatus to said second communication apparatus either in advance or by said control signal, or is stored in advance in both said first communication apparatus and said second communication apparatus.

14. The communication apparatus according to claim 12, wherein said first communication apparatus is a base station apparatus and said second communication apparatus is a mobile station apparatus.

* * * * *